United States Patent
Narushima

(10) Patent No.: US 6,774,951 B2
(45) Date of Patent: Aug. 10, 2004

(54) DIGITAL BROADCAST RECEPTION SYSTEM, DIGITAL BROADCAST RECEPTION APPARATUS AND DIGITAL BROADCAST PRINTING APPARATUS

(75) Inventor: Toshio Narushima, Kanagawa (JP)

(73) Assignee: Sony Corporation, Tokyo (JP)

( * ) Notice: Subject to any disclaimer, the term of this patent is extended or adjusted under 35 U.S.C. 154(b) by 299 days.

(21) Appl. No.: 09/791,261

(22) Filed: Feb. 22, 2001

(65) Prior Publication Data

US 2001/0022003 A1 Sep. 13, 2001

(30) Foreign Application Priority Data

Feb. 24, 2000 (JP) ..................................... P2000-052299

(51) Int. Cl.⁷ ............................................. G06F 15/00
(52) U.S. Cl. ...................... 348/552; 348/473; 358/1.15
(58) Field of Search ................................ 348/552, 553, 348/468, 473, 207.2; 358/1.15, 1.1; 725/37–61, 131–133, 139–141, 151–153

(56) References Cited

U.S. PATENT DOCUMENTS

| | | | | |
|---|---|---|---|---|
| 5,028,993 A | * | 7/1991 | Kobori et al. | 358/540 |
| 5,045,951 A | * | 9/1991 | Kimura et al. | 358/445 |
| 5,070,404 A | * | 12/1991 | Bullock et al. | 348/460 |
| 5,109,281 A | * | 4/1992 | Kobori et al. | 358/296 |
| 5,414,773 A | * | 5/1995 | Handelman | 725/117 |
| 5,497,372 A | * | 3/1996 | Nankoh et al. | 370/69.1 |
| 5,579,116 A | * | 11/1996 | Sugiyama et al. | 358/296 |
| 5,614,940 A | | 3/1997 | Cobbley et al. | |
| 5,715,020 A | | 2/1998 | Kuroiwa et al. | |
| 5,715,315 A | * | 2/1998 | Handelman | 380/234 |
| 5,917,959 A | | 6/1999 | Kagawa et al. | |
| 6,023,344 A | | 2/2000 | Yabe | |
| 6,111,613 A | * | 8/2000 | Sasano et al. | 348/468 |
| 6,219,106 B1 | * | 4/2001 | Sato | 348/525 |
| 6,297,851 B1 | * | 10/2001 | Taubman et al. | 348/572 |
| 6,366,359 B1 | * | 4/2002 | Garland | 358/1.15 |
| 6,493,106 B1 | * | 12/2002 | Gauthier et al. | 358/1.15 |

FOREIGN PATENT DOCUMENTS

| | | |
|---|---|---|
| EP | 0 369 821 | 5/1990 |
| EP | 0 410 608 | 1/1991 |
| EP | 0 788 279 | 8/1997 |
| GB | 2 217 948 | 11/1989 |

* cited by examiner

Primary Examiner—Michael H. Lee
Assistant Examiner—Paulos M. Natnael
(74) Attorney, Agent, or Firm—Frommer Lawrence & Haug LLP; William S. Frommer

(57) ABSTRACT

A printing apparatus for printing the content information contained in the digital broadcast received by an STB, in which flexible printing is achieved efficiently at a low cost. The digital broadcast is received by an STB 30 and demonstrated on a display device 31 as the contents information comprehended in the ddb is printed by a printer 32. The contents information comprehended in the digital broadcast is converted by a contents information conversion unit 68 into contents suited for printing.

13 Claims, 17 Drawing Sheets

```
1:   <html>
2:
3:   <head>
4:   <meta http-equiv="Content-Type"
5:    content="text/html; charset=x-sjis">
6:   <title>MYSTERIES OF UNIVERSE </title >
7:   </head>
8:
9:   <body bgcolor="Gray">
10:
11:  <p><br>
12:  </p>
13:
14:  <h3 align="left"><font size="4" face="FOR DISPLAY MIN-DYNASTY">ATTENTION ATTENTION ATTENTION</font></h3>
15:  <h1 align="center"><font color="Red" size="7" face=GOTHIC FOR DISPLAY">
16:  COMET COMET COMET</font></h1>
17:  <h3 align="right"><font size="4" face="FOR DISPLAY MIN-DYNASTY "> DISCOVERY DISCOVERY DISCOVERY</font></h3>
18:
19:  <p><br>
20:  </p>
21:
22:  <h3 align="center"><font color="Maroon" size="4">NOV. 17, 8:00 p.m.~
23:  8:55 p.m. </font>
24:  <br>
25:  <br>
26:  <font size="4" face="FOR DISPLAY MIN-DYNASTY">RECENTLY DISCOVERED</font><font color="#FF0080"
27:  size="4" face="NORMAL KAISHO-STYLE FOR DISPLAY><strong><b>COMET</b></strong></font><font
28:  size="4" face="SPECIAL PROGRAM OF "FOR DISPLAY MIN DYNASTY"></font></h3>
29:
30:  <p align="center"><font size="2"><br>
31:  <img src="file:image. gif"
32:  width="91" height="92"></font></p>
33:
34:  <p align="center"></p>
35:  </body>
36:  </html>
```

FIG.17

```
1:   <html.>
2:
3:   <head>
4:   <meta http-equiv="Content-Type"
5:    content="text/html; charset=x-sjis">
6:   <title>MYSTERIES OF UNIVERSE </title >
7:   </head>
8:
9:   <body bgcolor="#C0BFC2">
10:
11:  <p><br>
12:  </p>
13:
14:  <h3 align="left"><font point-size="14" face="FOR PRINT MIN-DYNASTY">ATTENTION ATTENTION ATTENTION</font></h3>
15:  <h1 align="center"><font color="#FE0500" point-size="36"face=GOTHIC FOR DISPLAY" >
16:  COMET COMET COMET</font></h1>
17:  <h3 align="right"><font point-size="14" face="FOR PRINT MIN-DYNASTY" >DISCOVERY DISCOVERY DISCOVERY </font></h3>
18:
19:  <p><br>
20:  </p>
21:
22:  <h3 align="center"><font color="#7E0100" point-size="14">nov. 17, 8:00 p.m.~
23:  8:55 p.m. /font>
24:  <br>
25:  <br>
26:  <font point-size="14" face="FOR PRINT MIN-DYNASTY" >RECENTLY DISCOVERED</font><font color="#FF0082"
27:  point-size="14" face="FOR PRINT MIN-DYNASTY" ><strong><b>COMET</b></strong></font><font
28:  point-size="14" face=SPECIAL PROGRAM OF "FOR PRINT MIN-DYNASTY"></font></h3>
29:
30:  <p align="center"><font point-size="10" ><br>
31:  <img src="file:image. gif"
32:  width="91" height="92"></font></p>
33:
34:  <p align="center"></p>
35:  </body>
36:  </html>
```

FIG.19

MYSTERIES OF UNIVERSE

ATTENTION ATTENTION ATTENTION

COMET COMET COMET
DISCOVERY DISCOVERY DISCOVERY

NOV.17, 8:00P.M.~8:55P.M.

SPECIAL PROGRAM OF RECENTLY DISCOVERED COMET

DIGITAL BROADCAST RECEPTION SYSTEM, DIGITAL BROADCAST RECEPTION APPARATUS AND DIGITAL BROADCAST PRINTING APPARATUS

BACKGROUND OF THE INVENTION

1. Field of the Invention

This invention relates to a digital broadcast reception system including a receiver for receiving digital broadcast, a display device for displaying digital broadcast received by a receiver and a printer for printing the content information contained in the digital broadcast received by the receiver. This invention also relates to a digital broadcast printer for printing the contents information generated by the receiver which has received the digital broadcast.

2. Description of Related Art

Up to now, in printing a display picture of e.g. television broadcast, demonstrated on e.g., a CRT (cathode ray tube) display, an analog video printer is used.

The analog video printer is fed e.g., with analog picture signals output from a display unit 500, as shown for example in FIG. 1. That is, in the embodiment shown in FIG. 1, TV signals or picture signals are input to a display device 500, which display device 500 displays a picture generated from these signals. To an analog printer 501 are fed analog picture signals corresponding to a picture demonstrated on the display device 500.

The analog video printer 501 digitizes the input analog video signals to store the resulting digital signals as picture data in a frame memory 502 as well as to update the stored picture data from time to time. On receipt of a printing command from outside, updating of the picture data to be recorded on the frame memory 502 is discontinued and picture data stored in the frame memory 502 is read out for printing by a printer engine 503.

The analog video printer 501 is provided with a printing confirmation display unit 504 employing e.g., a liquid crystal display. The picture data stored in the frame memory 502 is analogized to output resulting analog picture signals. The printing confirmation display unit 504 demonstrates a picture generated from the input analog video signals.

This analog video printer 501 is used for the application for printing a specified picture comprehended in continuous moving pictures data. So, printing commands input from outside are two-stage commands, namely commands for determining a picture to be printed from the moving picture data and a command for starting the printing processing on the so-determined picture. There are occasions where the analog video printer 501 is not provided with a printing confirmation display unit 504. In such case, the picture for printing cannot be confirmed at the outset.

The above-described conventional analog video printer 501 routinely uses input analog signals conventionally put to practical application, such as NTSC (National Television System Committee) signals, PAL (phase alternation by Line) signals, RGB video signals or S-terminal video signals, For printing a display picture of an information processor, such as a personal computer, abbreviated below to PC, an analog multi-scan printer or a PC printer is used.

An analog multi-scan printer 510 is fed with analog CRT interface signals, output from a main body unit of the PC 511 to the display device 512, as shown for example in FIG. 2. The analog multi-scan printer 510 branches the input analog CRT interface signals to output one of the branched signals to the display device 512 as well as to digitize the other branched signals for storage as picture data in the frame memory 513 for updating from time to time. If a printing command is input from outside, updating of the picture data to be stored in the frame memory 513 is discontinued and the picture data recorded in the frame memory 513 is read out for printing by the printer engine 514.

Meanwhile, RGB picture signals and synchronization signals thereof are used, as an example, as the analog CRT interface signals. As the signal modes, the signals in the following ranges:

horizontal resolution: 640 to 1600 dots vertical resolution: 480 to 1200 lines horizontal deflection frequency: 30 to 107 kHz vertical deflection frequency: 48 to 160 Hz are routinely used.

The analog multi-scan printer 510 has a multi-scan function for these variable signal modes, and is able to acquire picture data of the size suited to a picture for printing to print the data.

A PC printer 520 is fed with printing data over a universal printer interface, from a main body portion of the PC 521, in addition to picture signals output from the main body portion of the PC 521 to a display device 522, as shown for example in FIG. 3.

In the PC printer 520, an application program operating in the main body portion of the PC 521 generates text data or picture data. The text data or picture data, generated by the application program, is routed to an OS (operating system) for demonstration on the display device 522. When fed with a printing command, the OS starts a printer driver within the main body portion of the PC 521. The printer driver converts the text data or picture data into printing data of a form suited to the PC printer 520 connected to the main body portion of the PC 521 to send the printing data to the PC printer 520. The PC printer interprets the printing data sent thereto to effect printing by the printer engine 523.

This PC printer 520 uses e.g., the Bi-Centronics (IEEE-1284), RS-232C, SCSI, Ir-DA or USB, as the general-purpose printer interface.

In receiving e.g., television broadcast for display, the conventional practice has been to receive analog television signals by a reception device and to process these analog television signals by an analog electronic circuit for demonstration on a display device. However, such television broadcast is predicted to be made by digital signals, instead of by analog signals, as conventionally.

Specifically, in Japan, CS digital broadcast was started since October 1996, while digital broadcast is about to be started in CATV, BS broadcast and ground wave broadcast. If the television broadcast is digitized in this manner, pictures of higher quality than before is furnished. In addition, digitization enables not only picture signals but also SI (service information) signals to be furnished, such that, by these SI signals, it becomes possible to utilize the EPG (electronic program guide), that is the program guide information that can be demonstrated on the display device.

By the digitization of the television broadcast, not only the program broadcast but also the variable contents information can be demonstrated in combination on the display device. This contents information is made up of various data, such as still picture data, moving pictures data, text data or music data.

If, in printing the pictures of e.g., television broadcast or variable contents information, in the above-described current status of the art, the above-mentioned conventional analog printer 501, analog multi-scan printer 510 and the PC printer 520 are used, the degree of freedom of the printing functions or the cost in the printing device present a lot of problems.

Specifically, if the aforementioned analog printer 501 or analog multi-scan printer 510 is used, not only is the circuitry for performing the A/D conversion or D/A conversion required, but also measures need to be taken against signal deterioration or noise, thus complicating the structure of the apparatus to render it difficult to lower the cost. Moreover, the analog printer 501 or analog multi-scan printer 510 is required to be uniquely provided with contents information means for generating the contents information for printing, in addition to the contents information means for generating the contents information for display provided on the analog printer 501 or analog multi-scan printer 510, so that cost is needed to provide the unique contents information means.

Moreover, when the aforementioned PC printer 520 is used, since the general-purpose printer interface operates at a higher speed, it is possible to transfer picture data without limitation as to the resolution of the picture for printing or the printing quality. However, in such case, the major portion of the picture processing necessary in effecting printing in the printer engine 523 of the PC printer 520 needs to be performed on the main body portion of the PC 521.

In printing the contents information, the contents information for demonstration, generated by the contents information generating means for generating the contents information for demonstration, by the display device 500 or the main body portion of the PC 521, is converted into analog picture signals or analog CRT interface signals, which are then output to the analog printer 501 or to the analog multi-scan printer 510. Since the analog printer 501 or analog multi-scan printer 510 prints the input analog picture signals for demonstration or a display picture generated from the analog CRT interface signals directly by the printer engines 503, 514, the contents information cannot be printed with a picture quality sufficient for printing.

If, in interconnecting the television receiver for receiving and displaying the television broadcast and the printer device, picture data are sent out using a general-purpose printer interface similar to that used in the aforementioned PC printer 520, the televison receiver needs to be provided with a high-speed processing capability, a large capacity storage capacity and an output port of the high-speed general-purpose printer interface, thus raising the cost of the television receiver. Moreover, if no printer device is connected to the television receiver, it is unnecessary to provide for the high-speed processing capability, large capacity storage capacity or the output port of the high-speed general-purpose printer interface.

SUMMARY OF THE INVENTION

It is therefore an object of the present invention to overcome the aforementioned problems and to provide a digital broadcast reception system, a digital broadcast receiver and a digital broadcast printer, in which there is no necessity of providing redundant and hence wasteful circuit or functions, which can be realized at low costs and which may be used to effect the printing efficiently and flexibly to high quality.

In one aspect, the present invention provides a digital broadcast reception system having a receiver for receiving digital broadcast, a display device for displaying the digital broadcast received by the receiver, and a printer for printing the contents information comprehended in the digital broadcast received by the receiver, the receiver, display device and the printer being connected to one another. The receiver includes reception means for receiving the digital broadcast, contents information generating means for performing pre-set signal processing signals of the digital broadcast received by the reception means to generate the contents information for demonstration on the display device, and outputting means for outputting the contents information generated by the contents information generating means to the display device and to the printer. The printer includes inputting means for receiving the contents information output from the reception device, contents information converting means for converting at least a portion of the contents information received from the inputting means into contents suited to printing and printing means for printing the contents information converted by the contents information converting means.

In the digital broadcast reception system, according to the present invention, the contents information generated by the contents information generating means can be converted into contents suited for printing on the printer. So, there is no necessity of providing contents information converting means for generating the contents information suited for printing, such that, if the printer is not connected to the system, the entire system can be reduced in cost. Moreover, since the contents information for display may be converted by the contents information converting means of the printer, high-quality printing can be achieved efficiently flexibly.

In another aspect, the present invention provides a digital broadcast reception system having a receiver for receiving digital broadcast, a display device for displaying the digital broadcast received by the receiver, and a printer for printing the contents information comprehended in the digital broadcast received by the receiver, the receiver, display device and the printer being connected to one another. The receiver includes reception means for receiving the digital broadcast, contents information generating means for performing pre-set signal processing signals of the digital broadcast received by the reception means to generate the contents information for demonstration on the display device, contents information conversion means for converting at least a portion of the contents information generated by the contents information generating means into contents suited for printing by the printer, and outputting means for outputting the contents information generated by the contents information generating means to the display device and outputting the contents information partially converted by the contents information conversion means to the printer. The printer includes inputting means for receiving the contents information output by the receiver, and printing means for printing the contents information received from the inputting means.

In the digital broadcast reception system, according to the present invention, as discussed above, the contents information generated by the contents information generating means of the receiver can be converted into contents suited for printing on the printer. The receiver is able to output the contents information suited for printing on the printer in distinction from the contents information for demonstration on the display device. As a result, high-quality printing can be achieved efficiently with high flexibility.

In still another aspect, the present invention provides a digital broadcast receiver including reception means for receiving digital broadcast, contents information generating means for performing pre-set signal processing on signals of digital broadcast received by the reception means for generating contents information for demonstrating digital broadcast, contents information conversion means for converting at least a portion of the contents information generated by the contents information generating means, and outputting means for outputting the contents information generated by the contents information generating means to a display device for displaying the digital broadcast and for outputting the contents information partially converted by the contents information conversion means to the printer.

In the digital broadcast reception system, according to the present invention, as discussed above, the contents information generated by the contents information generating means of the receiver can be converted into contents suited for printing on the printer. The contents information suited for printing by a printer can be output in separation from the contents information for display on the display device. As a result, high-quality printing can be achieved efficiently with high flexibility.

In yet another aspect, the present invention provides a digital broadcast receiver including reception means for receiving digital broadcast, contents information generating means for performing pre-set signal processing on signals of digital broadcast received by the reception means for generating contents information for demonstrating the digital broadcast, contents information conversion means for converting at least a portion of the contents information generated by the contents information generating means into contents suited for printing, outputting means for outputting the contents information generated by the contents information generating means to a display device for demonstrating the digital broadcast, and printing means for printing the contents information converted by the contents information conversion means.

In the digital broadcast reception system, according to the present invention, as discussed above, the contents information generated by the contents information generating means of the receiver can be converted into contents suited for printing on the printer. As a result, high-quality printing can be achieved efficiently with high flexibility.

On the other hand, the digital broadcast printing apparatus according to the present invention is a digital broadcast printing apparatus for printing the contents information generated by the receiver on reception of the digital broadcast. The digital broadcast printing apparatus includes inputting means for receiving the contents information output from the receiver, contents information converting means for converting at least a portion of the contents information received from the inputting means, and printing means for printing the contents information converted by the contents information conversion means.

The digital broadcast printing apparatus according to the present invention, as discussed above, is able to convert the contents information generated by the receiver into contents suited for printing. As a result, high-quality printing can be achieved efficiently with high flexibility.

With the digital broadcast reception system, according to the present invention, described above, there is no necessity of providing contents information conversion means for generating the contents information suited for printing on the receiver. The system can be reduced in cost in its entirety in case of not connecting the printer to the system. Moreover, since the contents information for display can be converted into contents suited for printing by contents information conversion means of the printer, high-quality printing can be achieved efficiently with high flexibility, so that the digital broadcast can be displayed and printed as the properties of the digital broadcast that it comprehends variegated content information are exploited to the maximum extent possible.

Moreover, in the digital broadcast reception system, according to the present invention, the content information suited for printing in the printer can be output in addition to the content information for display on the display device, so that high-quality printing can be achieved efficiently with high flexibility, and hence the digital broadcast can be displayed and printed as the properties of the digital broadcast that it comprehends variegated content information are exploited to the maximum extent possible.

In addition, in the digital broadcast reception system, according to the present invention, the content information generated by the receiver can be converted into contents suited for printing to achieve high-quality printing can be achieved efficiently with high flexibility, and hence the digital broadcast can be displayed and printed as the properties of the digital broadcast that it comprehends variegated content information are exploited to the maximum extent possible.

BRIEF DESCRIPTION OF THE DRAWINGS

FIG. 17 shows a typical example of the contents information distributed by the digital broadcast for illustrating a typical case in which the contents information is stated in the HTML form.

FIG. 19 shows a typical case in which the contents information distributed by the digital broadcast is converted by the STB of the present invention into contents suited to printing.

DESCRIPTION OF THE PREFERRED EMBODIMENTS

Figure 1:
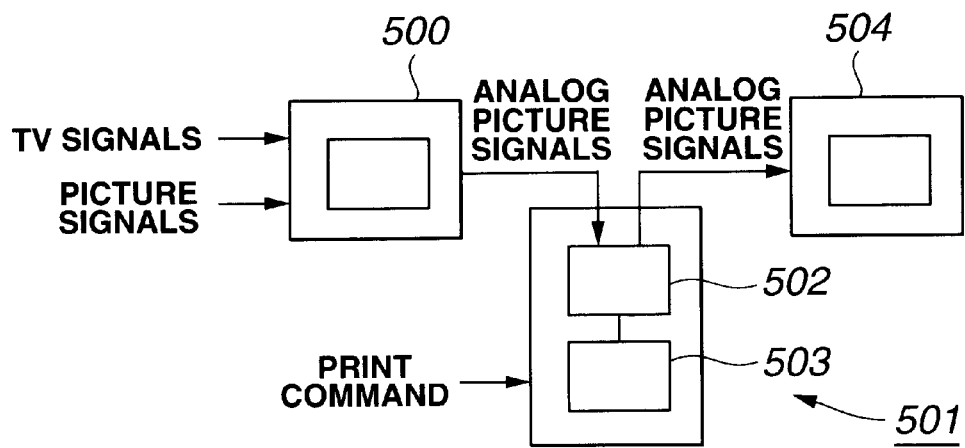
FIG. 1 is a schematic view showing a use configuration of a conventional analog video printer.
Figure 2:
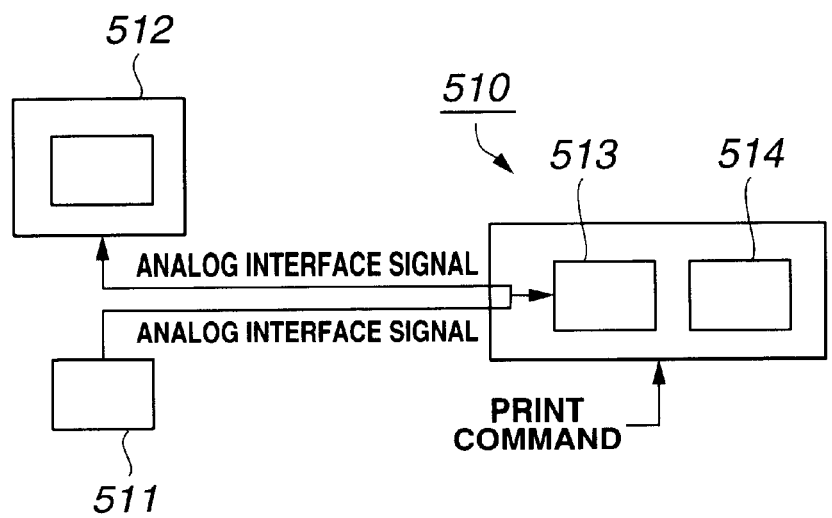
FIG. 2 is a schematic view showing a use configuration of a conventional analog multi-scan printer.
Figure 3:
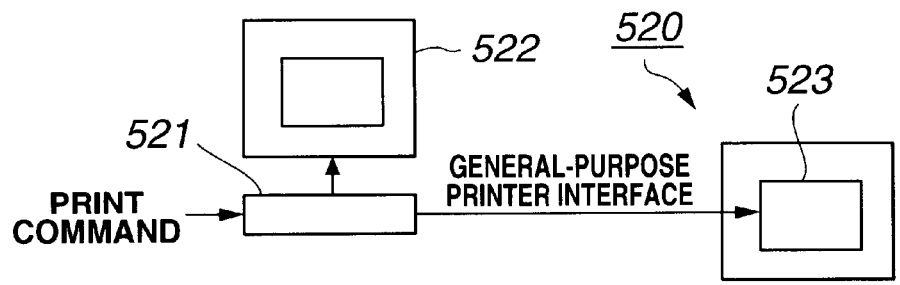
FIG. 3 is a schematic view showing a use configuration of a conventional PC printer.

Referring to the drawings, preferred embodiments of the present invention will be explained in detail. First, a case in which, in the present invention, the configuration of the combination of a reception device for receiving digital broadcast, a display device for demonstrating the digital broadcast and a printer device for printing a picture comprehended in the digital broadcast is changed in many ways, is explained.

In the following description, the digital broadcast means the broadcast sent by digital signals from a broadcasting station. The digital broadcast is not limited as to the configuration in which digital signals are sent out and may include broadcast sent out in a variety of configurations, such as routine ground wave broadcast, satellite broadcast, e.g., BS broadcast or CS broadcast, sending out signals over an artificial satellite, or cable broadcast, such as cable television sending out signals over a cable.

Figure 4:
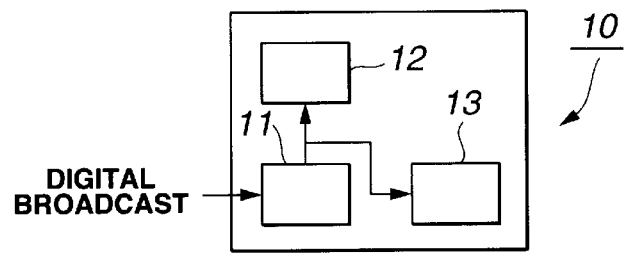
FIG. 4 is a schematic view showing a digital video receiver embodying the present invention.

The present invention may be applied to a digital television receiver 10, as shown in FIG. 4. The digital television receiver 10 includes a unitary structure comprised of a receiver 11 for receiving digital broadcast, a display unit 12 for demonstrating digital broadcast and a printer 13 for printing a picture comprehended in the digital broadcast. That is, the digital television receiver 10 is made up of a receiver, a display device and a printer in one unitary structure.

Figure 5:
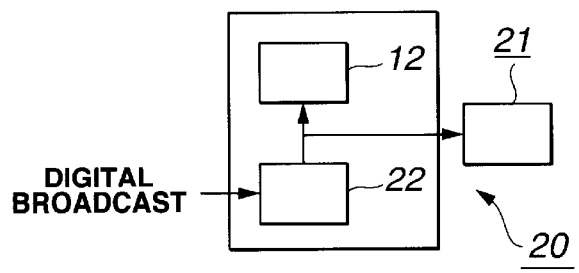
FIG. 5 is a schematic view showing a digital television receiver and a printer device according to the present invention.

The present invention may also be applied to a digital television receiver 20 and a printer 21 connected to this digital television receiver 20, as shown in FIG. 5. The digital television receiver 20 includes a receiver 22 for receiving digital broadcast and a display 23 for demonstrating the digital broadcast, in a unitary structure. That is, FIG. 5 shows a structure of the present invention in which the receiver and the display unit are arranged as a unitary structure and an outer printer, as a separate unit, connected to the unitary structure.

Figure 6:
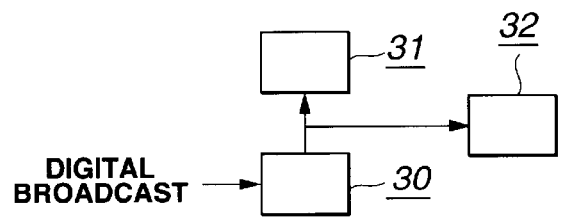
FIG. 6 is a schematic view showing an STB, a display device and a printer device embodying the present invention.

The present invention may be applied to a set top box (STB) 30, and a display device 31 and a printer 32, both connected to the STB 30, as shown in FIG. 6. The STB 30 has the function of receiving the digital broadcast. That is, the structure shown in FIG. 6 shows a typical case of constructing the receiver, display device and the printer independently according to the present invention and interconnecting the receiver, display device and the printer.

Figure 7:
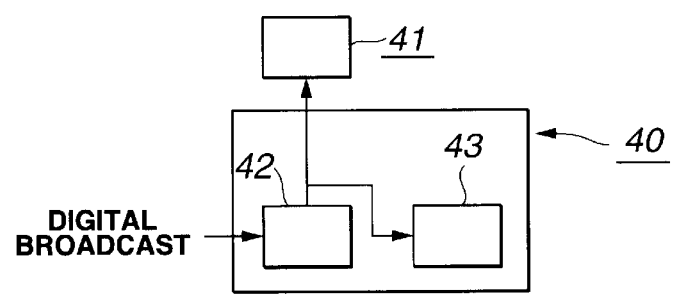
FIG. 7 is a schematic view showing an STB and a display device embodying the present invention.

The present invention can also be applied to the set top box (STB) 40 and to the display device 41 connected to this STB 40 for use. The STB 40 includes a receiver 42 for receiving digital broadcast and a printer 43 for printing a picture comprehended in the digital broadcast. That is, the embodiment of FIG. 7 represents a typical case of unifying the receiver and the printer as a unitary structure and connecting a display device as a separate unit to the unitary structure.

The present invention can be applied to variable combinations of a receiver for receiving digital broadcast, a display device for demonstrating the digital broadcast and a printer for printing the contents information comprehended in the digital broadcast. According to the present invention, the digital broadcast received by the receiver is used for demonstration on the display device and printing by the printer. It is noted that the printer in printing the contents information received by the receiver converts the contents information into contents suited for printing by contents information conversion means provided in the receiver and/or printer.

That is, according to the present invention, the contents information sent mainly for demonstration on the display device is changed in printing by the printer into contents suited for printing, so that printing can be achieved efficiently, flexibly and to high quality. Moreover, if the printer is provided in this manner with contents information conversion means, and if, for example, the printer is not connected to the receiver, that is if digital broadcast only is to be received and displayed, the entire system can be reduced in cost.

Meanwhile, means for interconnecting the receiver, display device and the printer for signal transmission may be a so-called wired signal transmission means for interconnecting signal lines, such as conductors or optical fibers, or so-called radio signal transmission means for transmitting signals by electrical waves or infrared rays. The signal transmission means may also be those constructed in accordance with various standards, such as IEEE802.3 (Ethernet), IEEE1394 or USB.

Since the present invention can be applied to a configuration comprising various combinations of the receiver, display device and the printer, such a configuration is now explained in which the respective devices are designed as separate devices, namely an STB 30, a display device 31 and a printer 32, as shown in FIG. 6.

Figure 8:
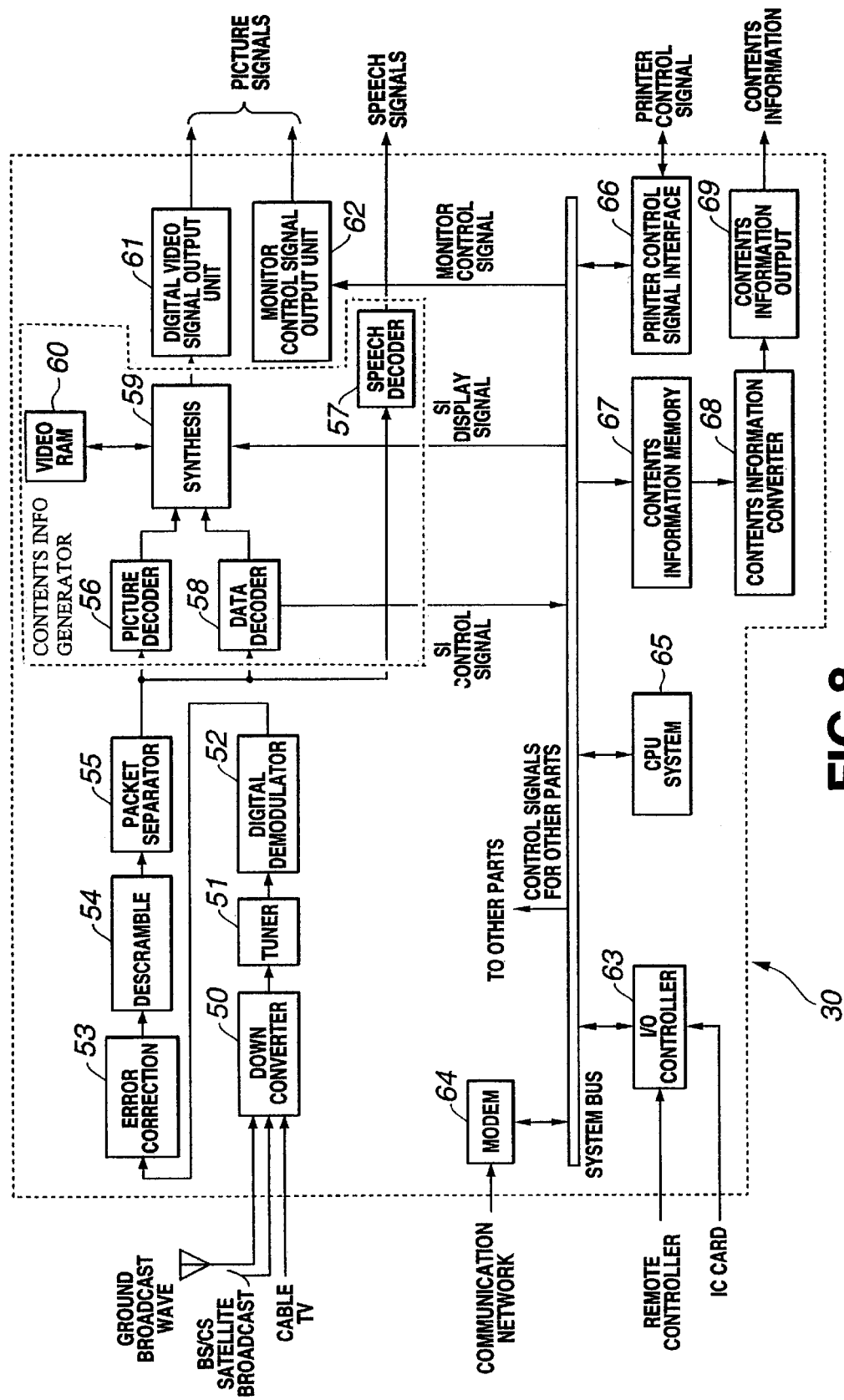
FIG. 8 is a schematic view showing an STB embodying the present invention.

Referring to FIG. 8, the STB 30 includes a downconverter 50, a tuner 51, a digital demodulator 52, an error correction unit 53, a descrambler 54, a packet disassembly unit 55, a picture decoder 56 a speech decoder 57, a data decoder 57, a synthesizer 59, a video RAM 60, a digital video signal outputting unit 61 and a monitor control signal outputting unit 62. The STB 30 also includes an I/O controller 63, a modem 64, a CPU system 65, a printer control signal interface 66, a contents information memory 67, a contents information conversion unit 68 and a contents information outputting unit 69. Meanwhile, in FIG. 8, the flow of a variety of signals, transmitted/received among various components making up the STB 30, is indicated by arrows.

The STB 30 may be configured for receiving a variety of digital broadcast, such as ground wave broadcast, satellite broadcast or wire broadcast. The following explanation is made for a case in which the STB is constructed as a receiver for receiving the CS digital broadcast, or so-called IRD (Integrated Receiver Decoder) now put to practical use. In the CS digital broadcast, the contents information, such as moving picture information, still picture information and SI (service information), are mixed as digital signals by the transmitting stations, such as broadcasting stations, various service providers and contents providers. Meanwhile, the SI signals mean signals corresponding to a table stating the various service information arranged in a pre-set transmission format. These digital signals may also be scrambled as necessary so that a receiver who has not entered into a pre-set contract with the transmitting station is unable to reproduce the digital broadcast correctly.

The downconverter 50 is connected e.g., to an antenna receiving the electrical waves allocated to the 12 GHz band to convert the received electrical waves into an intermediate frequency of 950 MHz to 2 GHz. Meanwhile, in the STB 30, the downconverter 50 need not be connected to the antenna as discussed above, it being only necessary if it is connected to an antenna receiving ground wave broadcast, an antenna for receiving satellite broadcast or a single line over which the wire broadcast is transmitted, depending on the digital broadcast send-out configurations.

The tuner 51 selects the stations for digital broadcast signals converted by the downconverter 50 into the intermediate frequency. That is, the tuner 51 selects signals of components of the digital broadcast signals corresponding to a pre-set channel. This tuner 51 is able to select a pre-set channel, as later explained, responsive to commands from a remote controller from a user.

The digital demodulator 52 performs QPSK (quadrature phase shift keying) demodulation on the digital broadcast signals as selected by the tuner 51. In this digital demodulator 52, the bandwidth is e.g., 27 MHz, with the transmission bitrate of the output bitstream being 42.192 Mbits per second.

The error correction unit 53 performs viterbi decoding, synchronization detection, Reed-Solomon decoding (204, 188) and deinterleaving on the QPSK demodulated digital broadcast signals, by the digital demodulator 52, to extract a transport stream (TS) of e.g., 29.162 Mbits per second. The error correction unit 53 sets the convolution rate for viterbi decoding to e.g., ½ to ⅞.

The descrambler 54 descrambles packets having a pre-set PID (packet ID) present in the transport stream extracted by the error correction unit 53. As the scrambling algorithm, MULTI2, belonging to the block cipher, may, for example, be used. The STB 30 may take out to outside the descrambled signals by high-speed data outputting at an output terminal.

The packet disassembly unit 55 performs the processing of taking out only the packet of a desired program from the signals descrambled by the descrambler 54. The signals obtained from the descrambler 54 are signals corresponding to the multiplexed versions of the contents information, such as picture information, speech information or the SI information in accordance with e.g., the MPEG2 standard. The packet disassembly unit 55 takes out only the packets of a desired program from the sent-out multiplexed signals. The packet disassembly unit 55 also acquires the SI information, while reproducing the clocks. The packet disassembly unit 55 outputs the packets taken out to the picture decoder 56, speech decoder 57, data decoder 58 and to the contents information memory 67.

Meanwhile, in the STB 30, the downconverter 50, tuner 51, digital demodulator 52, error correction unit 53, descrambler 54 and the packet disassembly unit 55 are formed as means for receiving the digital broadcast. Of course, the receiving means of the STB 30 is not limited to this configuration, it being only sufficient if the receiving means has the function of receiving the digital broadcast.

The picture decoder 56 and the speech decoder 57 decode the picture data and the speech data, encoded in accordance with e.g., the MPEG2 standard, based on the packets fed from the packet disassembly unit 55. The picture decoder 56 outputs the decoded picture data to a synthesizer, while the speech decoder 57 outputs the decoded speech data to outside as speech signals.

The data decoder 58 decodes the SI information acquired by the packet disassembly unit 55, that is the variable data information, such as the electronic program guide (EPG) information or the detailed program information. The data decoder 58 outputs the SI information, among the decoded signals, that can directly be expanded into displayable data, as SI control signal over a system bus to the CPU system 65. The SI control signals, thus output to the CPU system 65, is processed thereby, and is issued as SI display signals to the synthesizer 59. The CPU system 65 then performs conversion processing, exploiting the font data provided in the font ROM, based on the SI control signal, for conversion to displayable SI display signals. The data decoder 58 also decodes the contents information for printing by the printer 32 to output the decoded contents information to the contents information memory 67.

The synthesizer 59 synthesizes the picture data decoded by the picture decoder 56, the SI information decoded by the data decoder 58 and the SI display signals input from the CPU system 65, to prepare one-picture display data for the display unit 31. The synthesizer 59 transiently causes the prepared display data to be held temporarily on the video RAM 60 to complete the one-picture display data.

Meanwhile, in the present invention, the picture decoder 56, speech decoder 57, data decoder 58, synthesizer 59 and the video RAM 60 are formed as picture drawing means for the STB 30. It should be noted that the picture drawing means for the STB 30 is not limited to this configuration, it being only sufficient if the picture drawing means has the function of generating picture data by performing pre-set picture drawing processing based on the signals of the digital broadcast received by the aforementioned receiving means.

The digital video signal outputting unit 61 outputs the display data prepared by the synthesizer 59 to outside as digital signals.

The monitor control signal outputting unit 62 outputs the monitor control signal, output from the CPU system 65 over the system bus, to outside as a digital signal.

In the STB 30, the digital video signal outputting unit 61 and the monitor control signal outputting unit 62 are designed as so-called digital video interface for sending out the digital signals to the display unit 31 connected to outside. Meanwhile, the digital video signal outputting unit 61 and the monitor control signal outputting unit 62 are shown as separate units in FIG. 8. Alternatively, these may be constructed unitarily depending on the desired digital video interface.

In the STB 30, there is no limitation to the format of the digital signals sent out from the digital video signal outputting unit 61 and the monitor control signal outputting unit 62. It is however desirable to use the standardized signal formats. In such case, the STB 30 may readily be connected to the display device 31 having the same standard.

Among the standardized signal formats, there is the digital interface standards for Monitor) version 1.0, established in January 1999 by Japan Electronic Industry Development Association (JEIDA). This standard supports the following signal formats:

1) Digital data

TMDS (Transition Minimized Differential Signalling)

LVDS (Low Voltage Differential Signalling)

GVIF (Giga-bit Video Interface)
(one of three is indispensable)
2) Separated horizontal and vertical synchronization signals indispensable
3) Data enable signals indispensable
4) DDC (display data channel) indispensable
5) VESA hot plug signal (SENS) indispensable
6) USB (universal serial bus) optional By different combinations of the aforementioned signal formats, four standards shown in the following Table 1 are defined:

TABLE 1

| | data format | support signals | interface terminals receiver | interface terminals display device |
|---|---|---|---|---|
| standard 1a | TMDS | digital data, DDC, USB | MDR connector, 26, 20 pins and interchange parts | MDR connector, 26 pins and interchange parts |
| standard 2a | LVDS | digital data, DDC, USB | MDR connector, 26 pins and interchange parts | MDR connector, 26 pins and interchange parts |
| standard 2b | LDI | digital data, DDC, USB | MDR connector, 36 pins and interchange parts | MDR connector, 36 pins and interchange parts |
| standard 3 | GVIF | digital data, DDC, USB | MDR connector, 14 pins and interchange parts | MDR connector, 14 pins and interchange parts |

*LDI means LVDS display interface.

Of the four standards, shown in Table 1, the standards 2b and 3 are those for sending video and control signals using the same signal line. If designed to cope with these standards 2b and 3, the digital video signal outputting unit 61 and the monitor control signal outputting unit 62 of the STB 30 are desirably unified together, as discussed above, to send out the video and control signals using the same signal line.

Moreover, the I/O controller 63 of the STB 30 is connected to the system bus provided in the STB 30 and is fed with various operating commands by the user over e.g., a remote controller. The I/O controller 63 may also be configured to effect recording and/or reproduction on or from an IC card. Specifically, the information indicating whether or not a user is in a pre-set contract agreement with a broadcasting station in receiving scrambled digital broadcast or the assessment information in receiving payable digital broadcast may be recorded on the IC card to effect descrambling of the digital broadcast or to control the time left for reception based on the information read out from the IC card. The I/O controller 63 may also acquire the contract information from the broadcasting station or decode an E-mail received via the modem 64.

The modem 64, having the function of transmitting/receiving various information over e.g., the telephone network of the communication network, such as Internet, is connected to the system bus provided in the STB 30. Although it is not mandatory to provide the modem 64 in the STB 30, the following processing becomes possible by the provision of the modem 64:

The modem 64 transmits/receives (uplinks/downlinks) the assessing information for recording and/or reproduction on or from e.g., an IC card, over the communication network to the digital broadcasting station or a customer management center. If the SI information output from the data decoder 58 includes a command for acquiring the pre-set information by accessing the pre-set information address over a communication network, such information can be acquired by the modem 64. The information so acquired may, if necessary, be expanded by the CPU system 65 to generate SI display signals.

The CPU system 65 is made up e.g., of a CPU (central processing unit), a program ROM (read-only memory) or a flash memory. The CPU system 65 is connected to the system bus provided in the STB 30 to transmit/receive various control signals over this system bus to control various parts making up the STB 30. That is, the CPU system 65 is responsive to various operating commands from the user to control various parts of the STB 30. In FIG. 8, the arrows indicating the flow of various control signals transmitted/received between the system bus and the various parts of the STB 30 are partially not shown for simplicity.

The CPU system 65 also performs the processing of conversion to displayable SI display signals, by performing conversion processing exploiting font data provided in the font ROM, based on the SI control signal output from the data decoder 58, as discussed above. In this manner, the text information may be demonstrated by on-screen display (OSD) based on e.g., the SI information.

The printer control signal interface 66, connected to a system bus provided in the STB 30, has the function of transmitting/receiving printer control signals to or from the printer 32. The printer control signals are signals commanding the printer 32 connected to outside from the STB 30 to start or discontinue the print operation or specifying the size or contents of a picture for printing to the printer 32. The printer control signals are also signals for furnishing the information such as for completion of the printing operation, shortage of printing sheets or ink, or stuffing of the printing sheets, from the printer 32 to the STB 30.

By way of a specified operation, the printer control signal interface 66 sends, on receipt of a command for printing start by the user input to the I/O controller 63 over the system bus, a printer control signal commanding the start of the printing operation to the printer 32. When the printer 32 has completed the printing operation as regularly, the printer control signal interface 66 receives the information on completion of the printing operation sent from the printer 32 to confirm that the printing operation has been finished as regularly.

If the regular printing operation by the printer 32 is disabled by, for example, shortage or stuffing of the printing sheets, the printer control signal interface 66 receives this information to confirm that the printing operation has not been finished as regularly. At this time, the CPU system 65 of the STB 30 generates an SI control signal indicating that the printing has not been finished as regularly, and sends a pre-set picture signal to the display device 31 through the synthesizer 59 and the digital video signal outputting unit 61 to cause the display device 31 to display a picture indicating that the printing has not been finished as regularly.

The contents information memory 67 has the function of transiently holding the contents information prior to decoding processing input from the packet disassembly unit 55 or the contents information subsequent to the decoding input from the data decoder 58 over the system bus. That is, in the digital broadcast reception system, according to the present invention, the contents information memory 67 has the function of a so-called cache memory of transiently holding the contents information comprehended in the digital broadcast.

The STB 30 may be configured for transiently holding the desired contents information in the contents information memory 67 depending on a user command, or may be configured for updating the contents information comprehended in the received digital broadcast from time to time to store the occasionally updated contents information in the contents information memory 67.

In the contents information memory 67, the entire contents of the contents information displayed on the display device 31, that is the entire text and picture data, may be transiently stored, or only a portion used for printing by the printer 32 of the contents information for display on the display device 31 may be transiently stored. Specifically, only a portion of the picture data comprehended in the moving pictures data may be stored in the contents information memory 67, instead of storing the totality of the moving pictures data displayed on the display device 31 in the contents information memory 67. This saves the memory capacity to lower the cost.

Moreover, there may be transiently stored in the contents information memory 67 not only the contents information for demonstration on the display device 31, but also the contents information for printing, linked to the contents information for demonstration, that is the contents information comprehended in the printing-specific specified program channels or information addresses.

The contents information conversion unit 68 reads out the contents information for printing, from the various contents information transiently stored in the contents information memory 67, and converts the contents of the contents information into contents suited to printing characteristics of the printer 32. The contents information conversion unit 68 will subsequently be explained in detail.

The contents information outputting unit 69 outputs the contents information converted by the contents information conversion unit 68 to the printer 32.

The display device 31 in the digital broadcast reception system, according to the present invention, is hereinafter explained.

Figure 9:
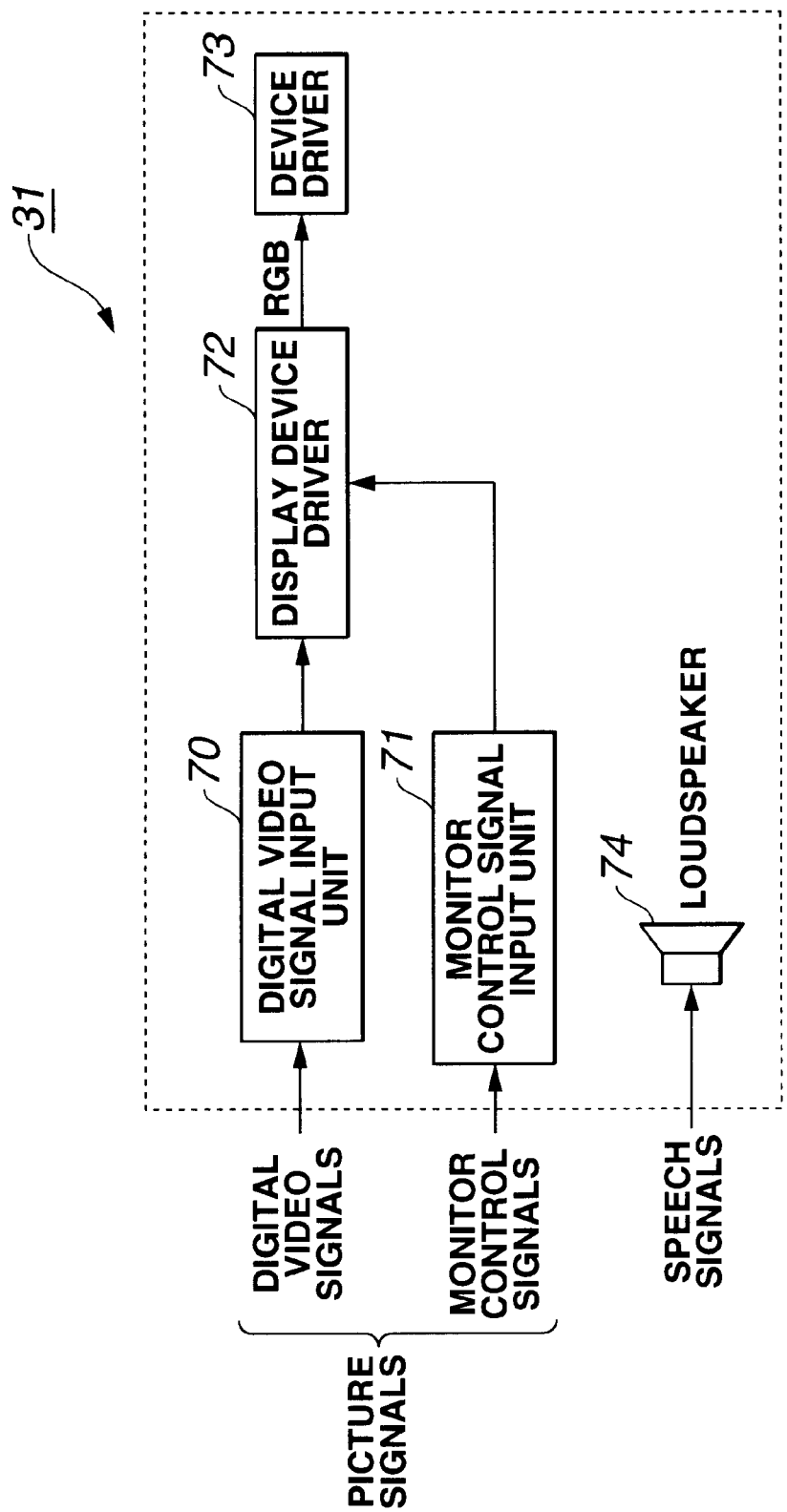
FIG. 9 is a schematic view showing a display device embodying the present invention.

Referring to FIG. 9, the display device 31 includes a digital video signal inputting unit 70, a monitor control signal inputting unit 71, a display device driving unit 72, a display device 73 and a loudspeaker 74. Meanwhile, in FIG. 9, the flow of various signals transmitted/received between respective parts of the display device 31 is indicated by arrows.

The digital video signal inputting unit 70 and the monitor control signal inputting unit 71 have the function of receiving picture signals transmitted from the STB 30, that is digital video signals and monitor control signals, and of extracting the contents information demonstrated on the display device 31 from these picture signals.

The display device driving unit 72 is fed with the contents information, extracted by the digital video signal inputting unit 70 and the monitor control signal inputting unit 71, and generates driving signals for driving the display device 73 based on this contents information. The driving signals may, for example, be RGB signals.

The display device 73 has the function of displaying a pre-set picture based on the driving signal generated by the display device driving unit 72. Specifically, the display device drive 73 may, for example, be a CRT (cathode ray tube), LCD (liquid crystal display) or a plasma display.

The loudspeaker 74 has the function of receiving speech signals transmitted from the STB 30 to reproduce the speech signals.

A typical display picture, demonstrated on the display device drive 73 in the display device 31, is now explained. The present invention can be applied for providing a general information terminal adapted not only for reception of digital broadcast, furnished to the households at large as ground wave broadcast, satellite broadcast or wire broadcast, but also for reception of pre-existing analog broadcast, or a variety of services of the Internet environment. In such general information terminal, it is crucial to realize selection and viewing of a large number of furnished programs readily and accurately and facilitated operations or variable services.

Figure 10:
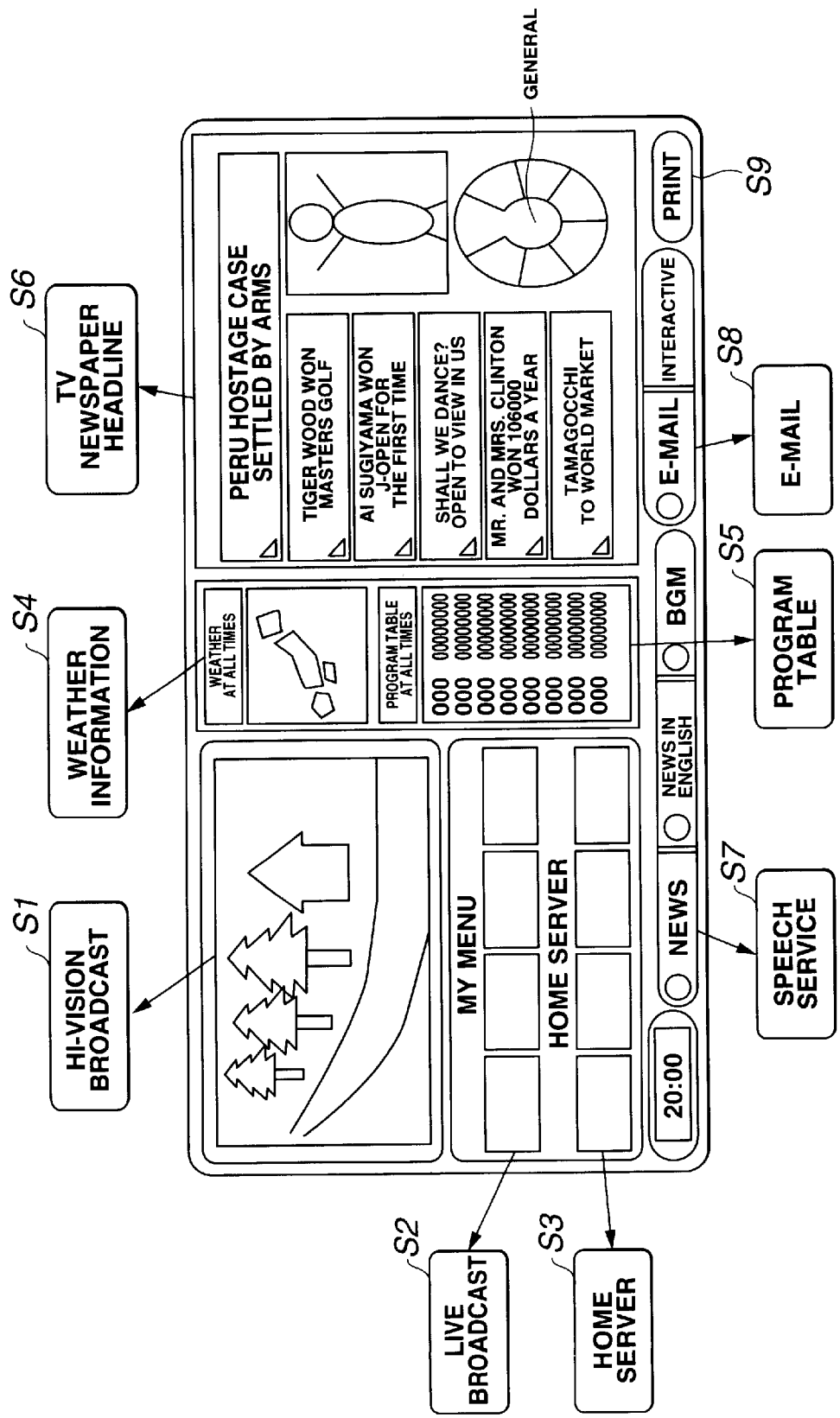
FIG. 10 is a schematic view showing a typical initial picture demonstrated on a display device embodying the present invention.

So, the display picture demonstrated on the display device drive 73 of the display device 31 is preferably a picture shown for example in FIG. 10 showing a typical initial picture demonstrated on the display device drive 73 directly after booting the display device 31. This initial picture on the display device 31 shown in FIG. 10 includes an area S1 for demonstrating the hi-vision broadcast being received, an area S2 for demonstrating a list of live programs being received, an area S3 for demonstrating a list of programs recorded in the home server, an area S4 for demonstrating the weather information, an area S5 for demonstrating a program table of various broadcasts, and an area S6 for demonstrating the text information such as headlines for television of newspaper.

The initial picture on the display device 31 also includes an area S7 for selecting the speech service such as various news or music, an area S8 for selecting or acting on a variety of Internet environments, such as E-mail, and an area S9 for commanding a printing operation on the printer 32.

That is, in the digital broadcast reception system, according to the present invention, the respective areas of the displayed picture comprise variable contents information comprehended in the digital broadcast, such that a large number of the contents information are combined and demonstrated on the display device 31. The contents information will be explained in detail subsequently.

The display picture forming variable picture, speech and services, that is the contents information, is synthesized by the synthesizer 59 of the STB 30 to a sole picture which is demonstrated on the display device drive 73 of the display device 31. For example, if a specified operational command is input from the user by a remote controller through an I/O controller 63, the STB 30 performs the processing, such as enlarged display, for pre-set pictures, speech or services.

Meanwhile, if the initial picture shown in FIG. 10 is demonstrated for a pre-set time after startup of the display device 31, with there being no operational command from the user, the display device 31 may be switched to display specified pictures, speech or services automatically. Alternatively, the array of the pictures, speech or the services may be customized freely responsive to the user request.

Figure 11:
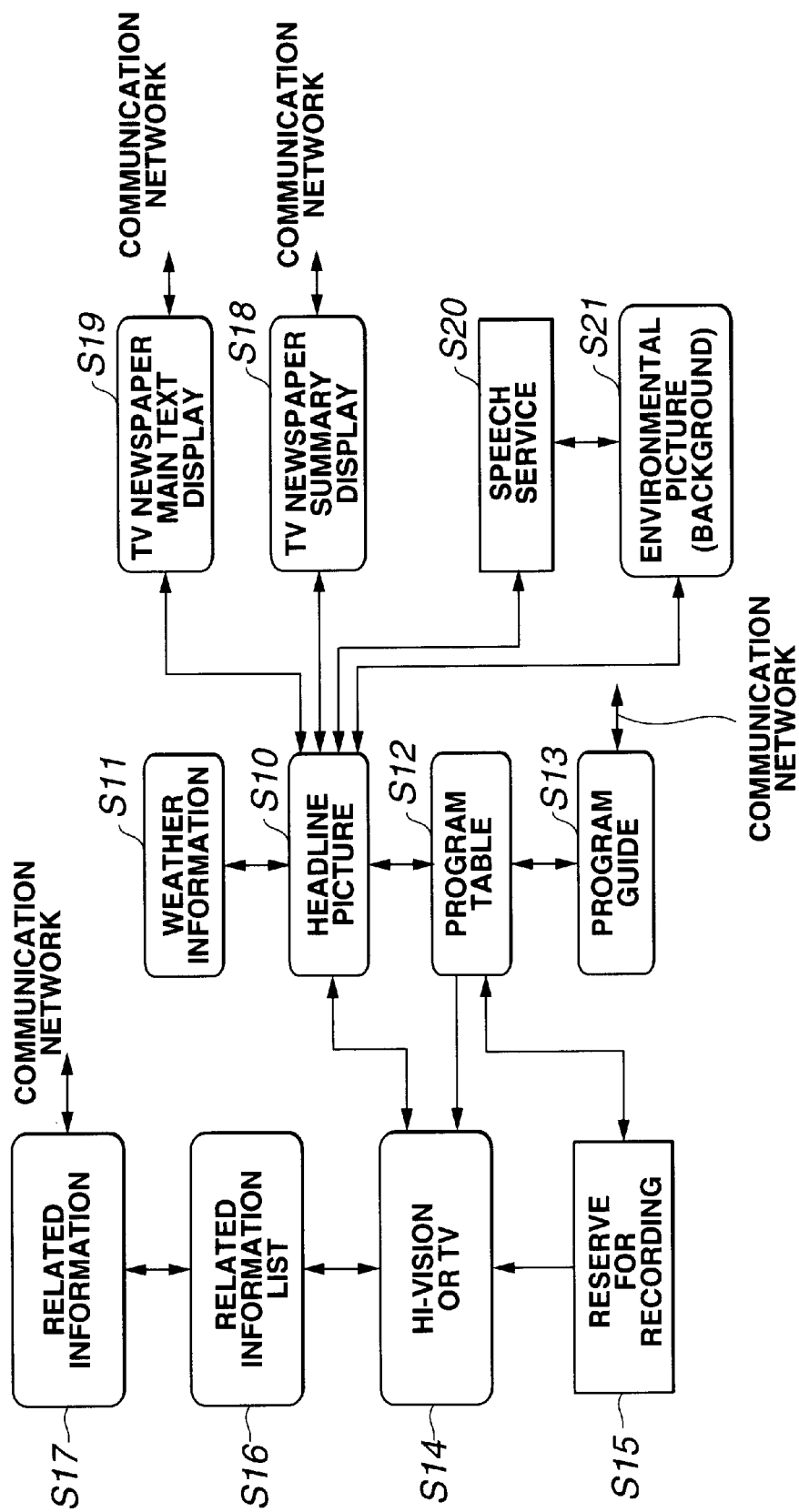
FIG. 11 is a flowchart showing a typical navigation in a picture demonstrated on the display device embodying the present invention.

Referring to FIG. 11, a typical navigation from the initial picture shown in FIG. 10, in the picture demonstrated on the display device 31, is explained. Meanwhile, in FIG. 11, changes in the contents demonstrated on the display device 31, caused by the pre-set operational command from the user, are indicated by arrows.

Directly after startup, the display device 31 is in a state S10 displaying the initial picture, as shown in FIG. 11. If, from this state, an operational command is input by the user for demonstrating the weather information, the display device 31 is in a state S11 in which the weather information is displayed to an enlarged scale on the display device drive 73. If, from this state, a pre-set operational commands is input by the user, the state S10 displaying the initial picture is resumed.

On the other hand, if, from the state S10 demonstrating the initial picture, an operational command of displaying the program table is input by the user, the display device 31 is in a state S12 in which the program table is displayed to an enlarged scale on the display device drive 73.

If, in this state, an operational command for demonstrating the detailed information as to the program is input by the user, the STB 30 accesses over a communication network by e.g., the modem 64 to acquire the detailed information as to the program to display the acquired information on the display device drive 73.

If, in the state S10 displaying the initial picture or in the state S12 displaying the program table, an operational command for selecting a pre-set program is input from the user, a state S41 is reached in which specified broadcast is displayed to an enlarged scale on the display device drive 73.

In the state S12 in which the program table is displayed to an enlarged scale on the display device drive 73, it is possible to transfer to the state S15 for reserving recording for a particular program under a pre-set operational command from the user. It is also possible in this state S15 to transfer the state S14 of displaying pre-set broadcast to an enlarged scale at a pre-set time point reserved for recording.

If, in the state S14 of demonstrating particular broadcast on the display device drive 73, a pre-set operating command is input from the user, a state S16 is reached in which a list for selection of the information pertinent to the displayed broadcast is to be selected. If, from this state S16, the particular pertinent information is selected, a state S17 is reached which demonstrates the pertinent information. This pertinent information is accessed by the STB 30 over the communication network by e.g., the modem 64 to acquire the pertinent information.

If, in the state S10 of displaying the initial picture, a pre-set operating command is input by the user, a state S18 is reached in which the summary of the television or the newspaper is reached. If a specified article is selected from this state S18, a state S19 is reached in which the main text pertinent to the article is demonstrated. Meanwhile, the contents of the television or the newspaper are acquired by e.g., the modem 64 in the STB 30 by accessing over the communication network. It is also possible to transfer from the state S10 of displaying the initial picture to a state S19 of demonstrating the main text of the television or the newspaper.

If, in the state S10 demonstrating the initial picture, an operational command is input by the user, a state S20 is reached in which the speech service is output as audio from the loudspeaker 74. Such a state may also be set in which an environmental picture is demonstrated at the same time as the speech is output as audio.

The printer 32 in the digital broadcast reception system according to the present invention is hereinafter explained.

Figure 12:
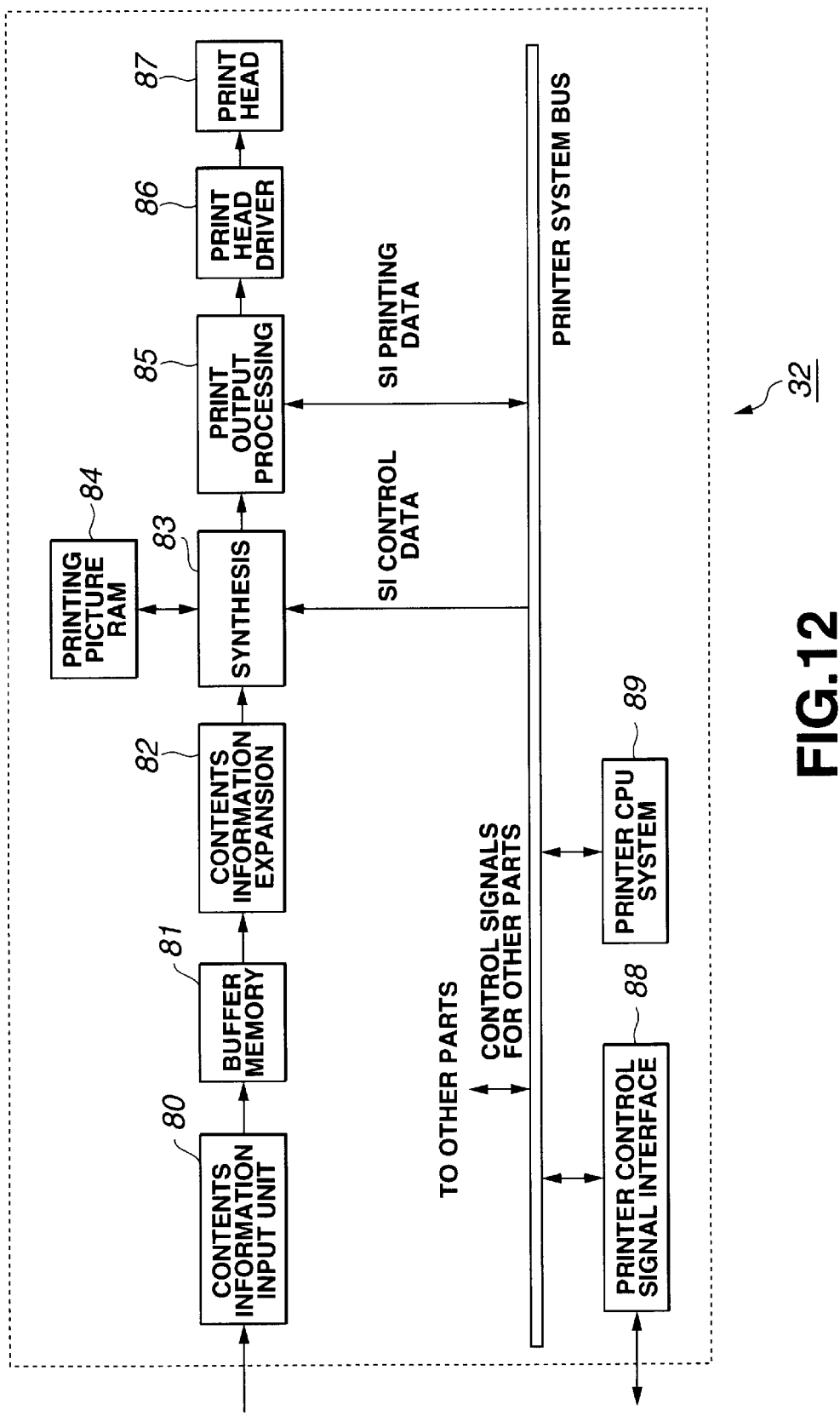
FIG. 12 is a schematic view showing a printer device embodying the present invention.

Referring to FIG. 12, the printer 32 includes a contents information inputting unit 80, a buffer memory 81, a contents information expanding unit 82, a synthesis unit 83, a print output processor 85, a printer head driving unit 86, a printer head 87, a printer control signal interface 88 and a printer CPU system 89. Meanwhile, in FIG. 12, the flow of various signals transmitted/received between various portions of the printer 32 is indicated by arrows.

The contents information inputting unit 80 receives the contents information from the contents information outputting unit 69 of the STB 30 for transient storage in the buffer memory 81. Although the buffer memory 81 may be omitted, if the buffer memory 81 is provided in the printer 32, the contents information can be transmitted speedily from the STB 30 to the printer 32 even if pre-set time must elapse until completion of the printing operation in the printer 32. Moreover, if, in the digital broadcast transmission/reception system, the buffer memory 81 has a sufficient memory capacity to hold the contents information printed by the printer 32, the contents information to be printed can be transmitted speedily from the STB 30 to the printer 32. This enables the STB 30 to save the other contents information in the contents information memory 67, in readiness for the next printing operation, without awaiting the completion of the printing operation in the printer 32.

The contents information expanding unit 82 expands the contents information, transiently held in the buffer memory 81, for conversion to data printable by a printer head 87, as later explained. The printable data then is output to the synthesis unit 83. If specifically the contents information comprises plural information data, such as picture data or text data, these data are expanded for re-construction as a picture for printing.

The SI data, that cannot be directly expanded by the contents information expanding unit 82, is output over a printer system bus to the printer CPU system 89 as later explained. The SI control data, thus output to the printer CPU system 89, is processed by the printer CPU system 89 and subsequently output to the synthesis unit 83 as SI data for printing. The printer CPU system 89 performs conversion processing on the SI printing data, using font data provided in a font ROM, based on the SI control data, for conversion into printable SI printing data.

The synthesis unit 83 synthesizes the contents information expanded by the contents information expanding unit 82, and the SI printing data, generated by the printer CPU system 89, to synthesize a picture for printing. The synthesis unit 83 transiently saves the picture for printing in a print picture RAM 84, while writing the completed picture for printing in this print picture RAM 84. On completion of the picture for printing, the synthesis unit 83 retrieves the picture from the print picture RAM 84 to output the completed picture to the print output processor 85.

The print output processor 85 has the function of generating printing data suited for printing by a printer head based on picture data synthesized by the synthesis unit 83.

The print output processor 85 performs conversion processing by a LUT (lookup table), operational processing exploiting a processing circuit capable of executing product sum processing at a high speed, operational processing by a software having high speed operational processing algorithm and/or processing by a dedicated conversion circuit. If, when the operational processing is sequentially carried out in this manner by the print output processor 85, the operational processing is carried out using the same number of bits as that of the input picture data, the respective data tend to be deteriorated in effective accuracy. It is therefore desirable with the print output processor 85 to increase the number of bits of the respective data with respect to the number of bits of the input picture data in the course of the operational processing and to decrease the increased number of bits to the original state at the ultimate stage of the operational processing. This evades the worsening of the effective accuracy.

The printer head driving unit 86 generates driving signals for driving the print head 87 based on the printing data generated by the print output processor 85.

The printer head 87 has the function of being driven based on a driving signal generated by the printer head driving unit 86 for printing a pre-set picture on the printing sheet. The printer 32 is provided with a printing head 87 and a sheet furnishing unit for furnishing the printing sheets, in a manner not shown in FIG. 12. Meanwhile, the sheet furnishing unit is similar in structure to that used in a variety of conventional printing devices and hence is not explained specifically.

The printer control signal interface 88 is connected to a printer system bus provided in the printer 32 and has the function of transmitting/receiving printer control signals to or from the STB 30. That is, the printer control signal interface 88 is equivalent to the printer control signal interface 66 in the STB 30 and has the function of receiving a command for start and/or stop the printing operation transmitted from the STB 30 and transmitting the information on the completion of the printing operation by the printer 32 or shortage in the printing sheets to the STB 30.

The printer CPU system 89 is made up e.g., of a CPU, a program ROM, a RAM and a flash memory. The printer CPU system 89 is connected to a printer system bus provided in the printer 32 and effects transmission/reception of various control signals over this printer system bus to control various portions of the printer 32. That is, the printer CPU system 89 controls various portions of the printer 32 based on the commands for start of the printing operation received by the printer control signal interface 88. Alternatively, the printer CPU system 89 receives the information from various portion of the printer 32 over the printer system bus to process the information on the completion of the printing operation or on the shortage of the printing sheets, for example, to transmit the results to the printer control signal interface 88.

A specified illustrative structure of the print output processor 85 is hereinafter explained.

Figure 13:
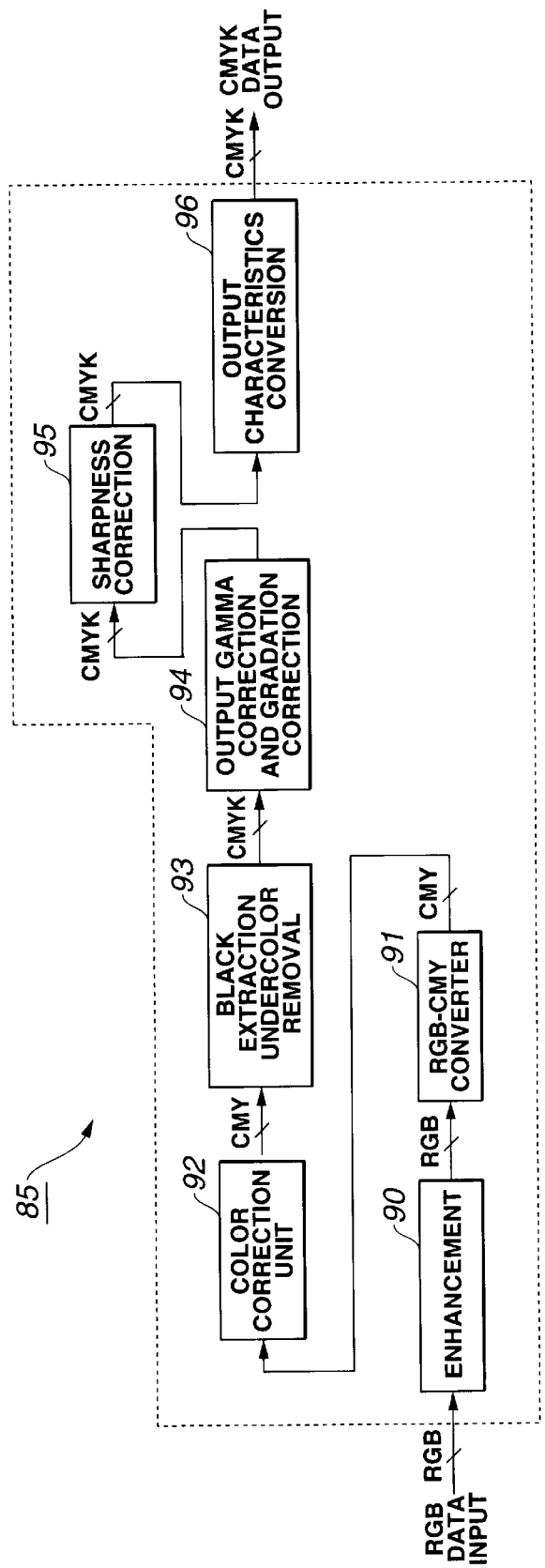
FIG. 13 is a schematic view showing an illustrative structure of a print output processing unit in the printer device embodying the present invention.

Referring to FIG. 13, the print output processor 85 includes an enhancing unit 90, an RGB-CMY conversion unit 91, a color correction unit 92, a black extraction undercolor removing unit 93, a sharpness correction unit 95 and an output characteristic conversion unit 96. In FIG. 13, the flow of various signals transmitted/received between respective parts of the print output processor 85 is indicated by arrows.

If the number of pixels of the picture data output by e.g., the RGB signals from the synthesis unit 83 is smaller than the number of pixels of the picture for printing, the enhancing unit 90 performs an enhancing processing on the input picture data for conversion into the number of pixels suited for printing.

Figure 14:
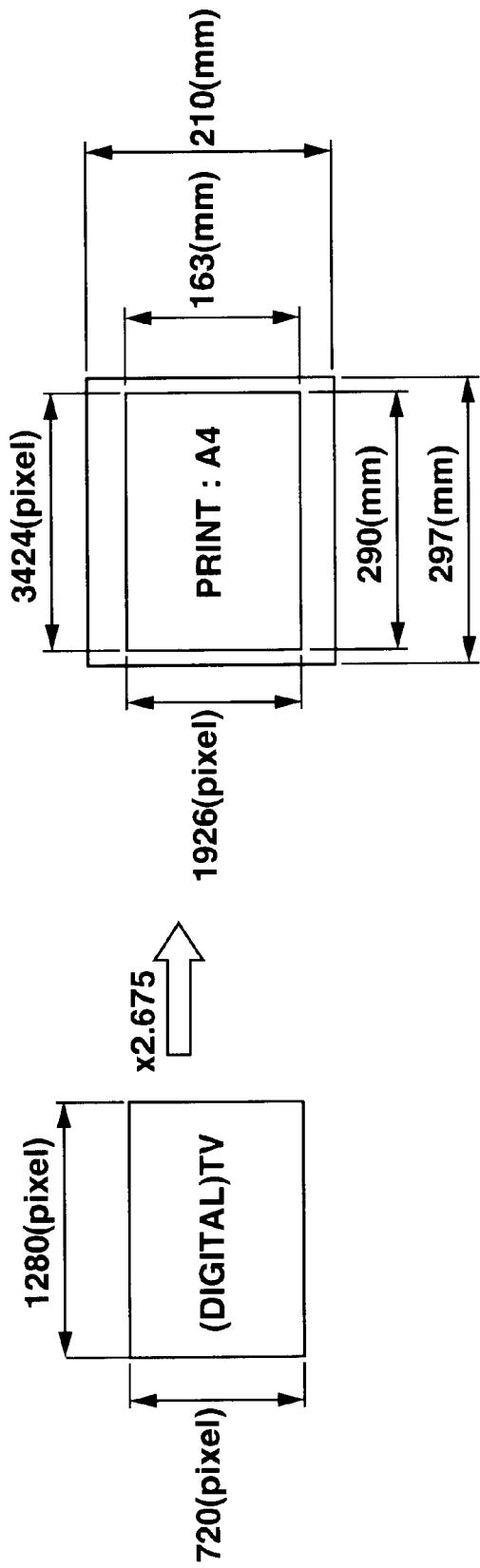
FIG. 14 is a schematic view showing the processing in an enhancing unit in the printer device embodying the present invention.

The enhancing unit 90 is fed from the synthesis unit 83 with picture data corresponding to 720 p (720×1280 pixels) as one of the standards for the moving pictures of the digital broadcast as shown for example in FIG. 14. At this time, if the printer 32 performs printing with 300 dpi on an A4-format printing sheet, the enhancing unit 90 enhances the number of pixels in the horizontal and vertical directions of the input picture data by a factor of 2.675 for conversion to picture data made up of 1926×3424 pixels.

The RGB-CMY conversion unit 91 converts RGB signals of the picture data converted by the enhancing unit 90 to generate CMY signals corresponding to the ink or the toner constituted by the respective colors of C(cyan), M(magenta) and Y(yellow) as used in the printer head 87. This conversion processing may be realized by, for example, density log conversion, complementary color conversion or linear masking conversion.

The color correction unit 92 performs color correction processing on the CMY signals generated by the RGB-CMY conversion unit 91. Thus, the printer 32 is able to correct the deviation between the color tone and especially the color hue and the saturation of a printed picture produced when the spectroscopic absorption characteristics of the ink or the toner used in the printer head 87 differs from the ideal characteristics by the subtractive color mixing. Specifically, the color correction processing performed by the color correction unit 92 may be realized by conversion by operational processing employing the LUT (lookup table), conversion by linear masking processing or processing employing non-linear masking operational processing.

If the gamut of color characteristics that may be represented in the picture data input to the printer 32 differs from that may be reproduced on the printing sheet by the printer head 87, compression or clipping is performed on the color characteristics of the picture data by the color correction unit 92. By so doing, if picture data exceeding the gamut of the color characteristics that may be reproduced by the printer head 87 is input to the printer 32, the information on the color characteristics comprehended in the picture data may be efficiently used to perform optimum printing.

If the printer head 87 is provided with the ink or the toner of the black color (K), the black extraction undercolor removing unit 93 extracts the black color and the undercolor of the picture data corrected for color by the color correction unit 92. That is, the black extraction undercolor removing unit 93 extracts the K component included in the CMY signals input from the color correction unit 92, while subtracting the vale corresponding to the K component extracted from the C, M and Y components to generate CMYK signals made up of the components C, M, Y and K.

So, among the methods for extracting the K component of the CMY signals for substitution to CMYK signals, there are, for example, a method for extracting the entire black component contained in the CMY signal, a method for extracting and substituting a pre-set proportion of the K component and a method for extracting and substituting the K component in an area exceeding a pre-set density.

By converting the CMY signals by the black extraction undercolor removing unit 93 into CMYK signals by the black extraction undercolor removing unit 93 in the printer 32 and by printing the K component contained in the CMY signal with the black ink or toner, the black color portion, difficult to reproduce using only the C, M and Y inks or toners, can be printed with an optimum printing quality. If the black ink or toner is not provided in the printer head 87 of the printer 32, the black extraction undercolor removing unit 93 does not perform the black color extraction substitution processing. Alternatively, the print output processor 85 may be constructed without providing the black extraction undercolor removing unit 93.

An output gamma correction/gradation correction unit 94 performs gamma correction and gradation correction processing on picture data made into the CMYK signals by the black extraction undercolor removing unit 93. Specifically if the half-tone reproducing method in the printer head 87 has characteristic output properties, the output gamma correction/gradation correction unit 94 performs gamma correction and gradation correction suited to the output properties on the input picture data.

A sharpness correction unit 95 performs enhancement and smoothing processing for the picture contour on the picture data corrected by the output gamma correction/gradation correction unit 94. This improves the quality of the printed picture in the printer 32.

The output characteristic conversion unit 96 converts various characteristics of the picture data processed by the sharpness correction unit 95, depending on the sort of the printer head 87, driving method for the printer head 87, type of the printing sheets or the type of the ink or toner, so that the picture for printing will be optimum in printing quality. Also, the various characteristics are converted depending on the printing environment temperature, heat hysteresis characteristics in the printer head 87, and on variations of the printing device provided in the printer head 87.

Of the conversion processing operations for various characteristics of the picture data, the conversion processing which should be corrected may be carried out in the printer control signal interface 66.

Figure 15:
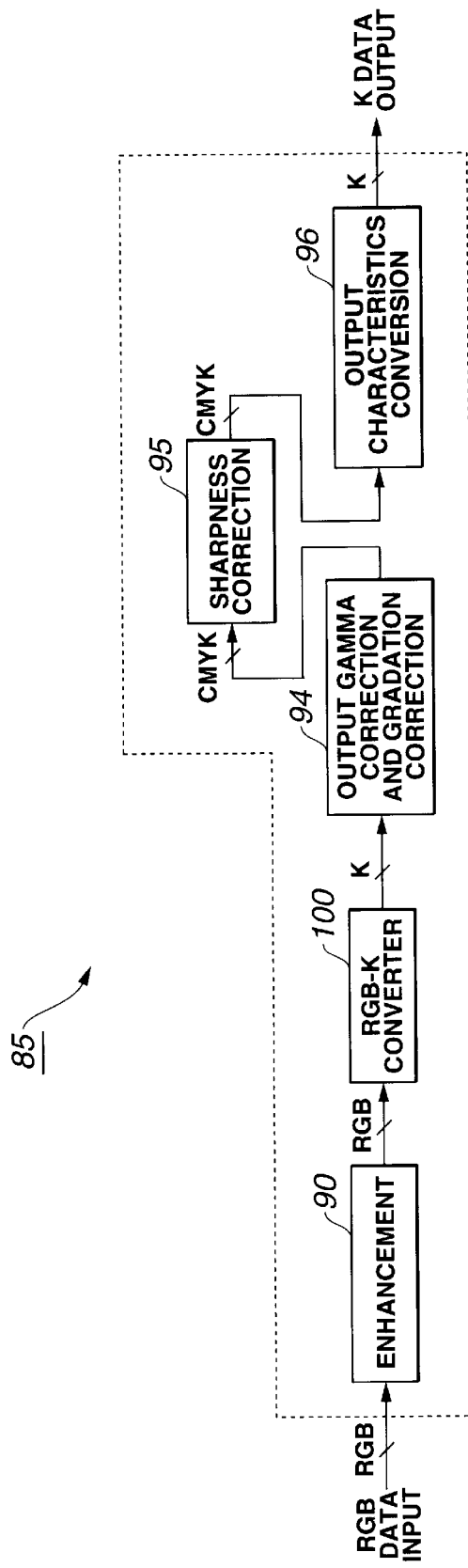
FIG. 15 is a schematic view showing another illustrative structure of a print output processing unit in the printer device embodying the present invention.

Referring to FIG. 15, an illustrative structure of the print output processor 85 in case of printing only with black ink or toner in the printer head 87 is now explained. In FIG. 15, those parts which are the same as or equivalent to those shown in FIG. 13 are denoted by the same numerals and are not explained specifically.

In case printing is made by the printer head 87 only with the black ink or toner, the print output processor 85 includes the enhancing unit 90, an RGB-CMY converter 100, the output gamma correction/gradation correction unit 94, sharpness correction unit 95 and the output characteristic conversion unit 96, as shown in FIG. 15. That is, the print output processor 85 in this case includes an RGB-K converter in place of the aforementioned RGB-CMY conversion unit 91, color correction unit 92 and the black extraction undercolor removing unit 93, as discussed above.

The RGB-CMY converter 100 performs pre-set operational processing, based on picture data output from the enhancing unit 90 with the RGB signal, to generate a K signals composed only of the black (K) density information. In this RGB-CMY converter 100, the K signal is generated e.g., based on the luminance information Y as found from the following equation (1):

$$Y = 0.2126 \times R + 0.7152 \times G + 0.0722 \times B \quad (1)$$

where R, G and B denote the luminance of R, G and B components in the RGB signals.

There are occasions wherein, if printing is to be made only with black color (K) by the printer head 87, the printer head 87 is unable to reproduce the totality of the gradations comprehended in the picture data, as shown in FIG. 15. In such case, dithering processing is carried out in the sharpness correction unit 95 or in the output characteristic conversion unit 96 depending on the number of gradations that can be reproduced by the printer head 87. In the dithering processing, pseudo gradations are represented using e.g., the organized dithering method or the error diffusion method.

In the following, a specified illustrative structure of the printer head 87 is explained. In the following explanation, it is assumed that the printer head 87 of the printer 32 is applied to a so-called monochromatic laser printer.

Figure 16:
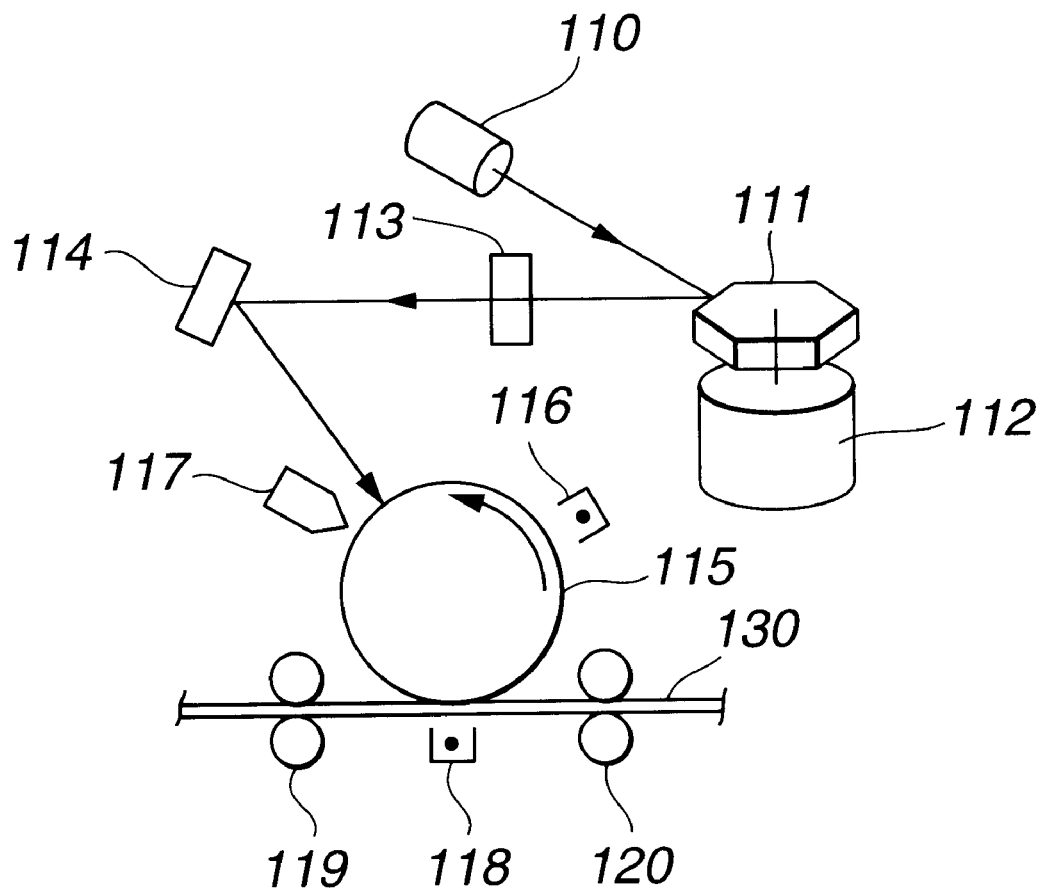
FIG. 16 is a schematic view showing an illustrative structure of a printer head in the printer device embodying the present invention.

Referring to FIG. 16, the printer head 87 includes a laser outputting unit 110, a polygonal mirror 111, a motor 112, a lens 113, a reflecting mirror 114, a photosensitive drum 115, an electrical charger 116, a developer 117, a transcription charger 118 and a pair of transporting rolls 119, 120.

If the printer head 87 is constructed as a monochromatic laser printer, picture data converted as K signals by the print output processor 85 is converted by the printer head driving unit 86, herein constructed e.g., as a laser controller or laser driver, into laser output signals, which are output as laser light from the laser outputting unit 110 in synchronism with e.g., the polygonal mirror 111.

The laser light output from the laser outputting unit 110 is reflected by the polygonal mirror 111, which is run in rotation by the motor 112 driven by a polygonal mirror drive, not shown, and is passed through the lens 113 and the reflecting mirror 114 to linearly scan the major surface of the photosensitive drum 115. The photosensitive drum 115 is run in rotation by a drum driving motor, not shown, with the laser light scanning direction as the axis of rotation. The photosensitive drum 115 is electrically charged by the electrical charger 116 and is scanned by the laser light to form a latent image corresponding to the picture data corresponding to the picture data.

The latent image, formed on the major surface of the photosensitive drum 115, is fed with a toner by the developer 117 to form a toner image. When the toner image reaches a position facing the transcription charger 118, with rotation of the photosensitive drum 115, it is transcribed to a printing sheet 130 transported by the transporting rolls 119, 120 from a sheet furnishing unit, not shown. The toner then is fixed by a fixing unit, not shown, on the printing sheet 130 and is ejected outwardly from the printer 32.

Although the printing system by the printer 32 as discussed above uses a conventional monochromatic laser printer, the present invention is not limited to this monochromatic laser printing system. For example, the present invention can be applied to a variety of other printing systems, such as a color laser printing system employing plural photosensitive drums, an ink jet printing system, a heat-sensitive printing system or a sublimation type heat transfer printing system.

The contents information in the digital broadcast reception system, embodying the present invention, is hereinafter explained in detail.

In the present invention, the contents information is the information contained in the digital broadcast received by the STB 30, and may be enumerated by, for example, the moving picture information, still picture information, text information and the SI information. In demonstrating a picture, combined from various information, as shown for example in FIG. 10, on the display device 31, a variety of markup languages, routinely used in the digital broadcast or on the Internet, may be used. These markup languages may be enumerated by, for example, HTML (hyper text markup language), XML (extensible markup language), SGML (standard generalized markup language) and MHEG-5 (Multimedia and Hypermedia Experts Group part 5). This markup language describes the logical structure of a document by a symbol termed a tag and enables a portion of a document to be linked to other documents or pictures.

The present invention is not limited to the specified structural contents of the contents information. However, if the digital broadcast is to be distributed as it is mixed with a variety of the contents information, the aforementioned moving picture information, still picture information, text information and SI information can be freely combined together and used with the aid of the markup language. In the following, a case in which the contents information is constructed by the aforementioned markup language is explained in detail.

Figure 18:
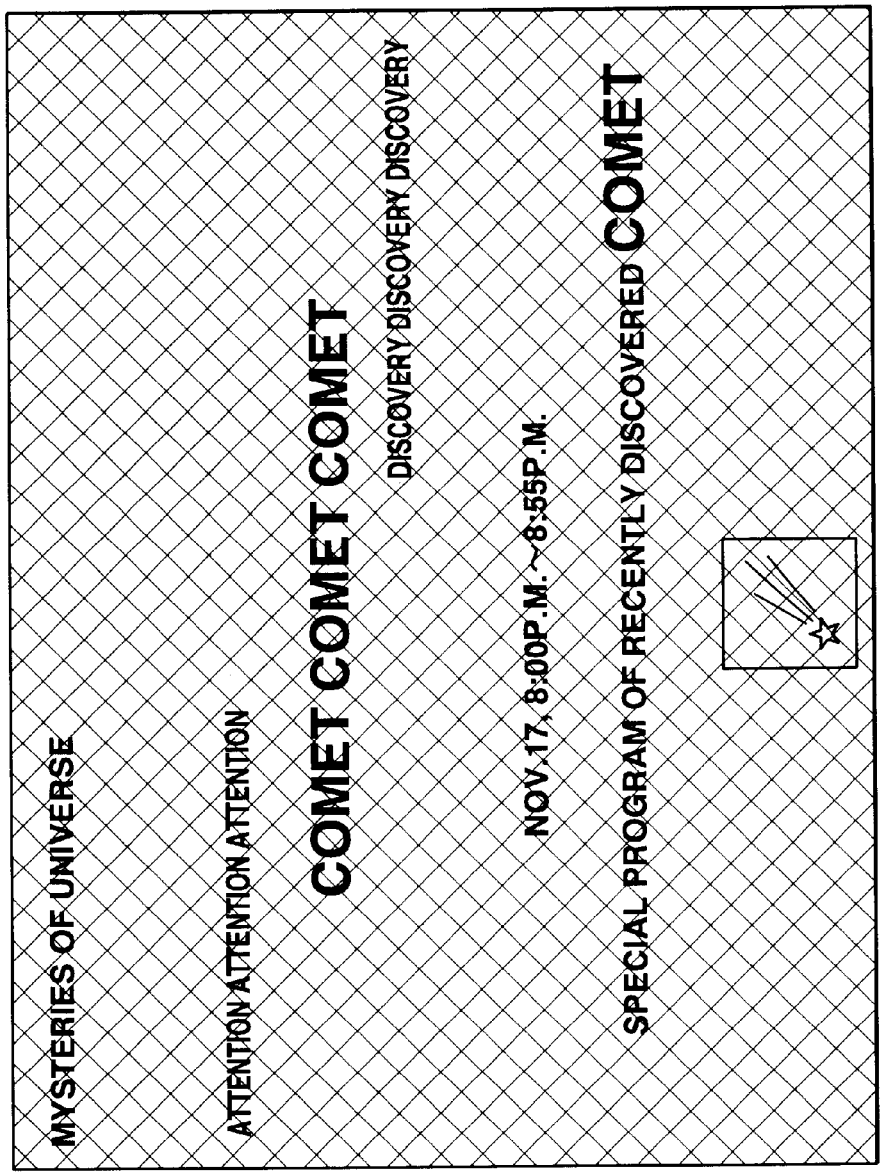
FIG. 18 shows a typical case in which the contents information distributed by digital broadcast is demonstrated by a display device.

For example, if the contents information comprehended in the digital broadcast received by the STB 30 is described in the HTML form, as shown in FIG. 17, this description is expanded by e.g., the picture decoder 56, data decoder 58 and the CPU system 65 in the STB 30, so that a picture shown in FIG. 18 is demonstrated on the display device 31. Meanwhile, the row numbers, entered in the beginning portion of each row in FIG. 17 for use in the subsequent explanation, are actually unnecessary. Those portions of the picture demonstrated on the display device 31 are shown shaded in FIG. 18.

That is, since the contents information distributed by digital broadcast is routinely used for an application for demonstration on the display device 31, the background color tends to be high in density, or tends to be of the same order of magnitude as the luminance of the text color. So, if the contents information is directly printed, the printed contents are extremely poor in appearance.

So, according to the present invention, the contents information stated as shown in FIG. 17 is converted by the contents information conversion unit 68 provided in the STB 30 into the HTML form shown for example in FIG. 19.

Figure 20:
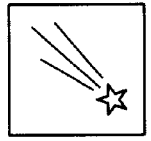
FIG. 20 shows a typical case of printing the contents converted by the STB by a printer device.

Specifically, the tag specifying the background color on line 9 in FIG. 17 (<body bgcolor="Gray">) is converted by the contents information conversion unit 68 as indicated in line 9 in FIG. 19 (<body bgcolor="#COBFC2">). That is, the contents information conversion unit 68 converts the contents information, specified so that the background color in demonstration on the display device 31 will be gray, into that with the pale background color. So, if the as-converted contents information is printed by the printer 32, there may be obtained printing results improved in text appearance as shown in FIG. 20. Although the background color is intially stated as the appellation [Gray], this description is converted into the statement by numerical representation by the RGB value (#COBFC2). This assures adjustment to a higher precision of the color tint or gray scale at the time of printing.

Moreover, the contents information conversion unit 68 converts the description specifying the size or style of the display fonts in the display device 31 in FIG. 17 (<font size="4" face="Min-dynasty for display">), for conversion to the description which improves the appearance on printing (<font point-size="4" face="Min-dynasty for printing">) as shown in FIG. 19. This allows to prevent the appearance at the time of printing from being worsened due to the difference between the display resolution in the display device 31 and the printing resolution in the printer 32. Meanwhile, if the appearance in the printer 32 is higher than that in the display device 31, the text specified to be displayed with the bit map form fonts may be converted so that the text will be printed with an out-line form (vector form) fonts.

Also, the contents information conversion unit 68 converts the description on lines 26 and 27 of FIG. 17 specifying the color or the size of the fonts for display and the style (<font color="#FF0080", size="4", face="normal square style for display">) into the description for printing (<font color="#FE0082", point-size="14", face="Min-dynasty style for printing">). In this case, the text color at the time of printing is changed to (#FE0082) so that the text demonstrated with the font color (#FF0080) specified by the display device 31 will appear equally on the picture on printing. This permits the printer 32 to print the contents information with the same color characteristics as those on the picture. If the style of the text demonstrated on the display device 31 (normal square style for display) is not provided on the CPU system 89 of the printer 32, the style is changed to the default style provided on the printer 32 (Min-dynasty for printing).

In the foregoing description, the contents information is assumed to be stated in a HTML style document widely used on the Internet. It should, however, be noted that the present invention is not limited to the conversion processing as discussed above.

The contents information may be such information that can be demonstrated and printed by e.g., the CSS (cascading style sheet) added to the HTML style document. In such case, the contents of the CSS description may be converted by the contents information conversion unit 68 to improve the appearance on printing.

It is sufficient for the contents information conversion unit 68 to convert the contents information stated for display on the display device 31 to change e.g., the font color or size, style, margin size of the printing sheet or the space between the fonts and rows, for changing the contents to those suited for printing for improving the appearance of the text comprehended in the contents information.

Moreover, it is possible for the contents information conversion unit 68 not only to convert the contents of the tags stated by the markup language as discussed above but also to convert the picture data for improving the appearance or the picture quality on printing.

It is also possible for the contents information conversion unit 68 to perform dithering or smoothing on text or picture data comprehended in the contents information. The text or picture data may also be converted as to the color, density or in resolution so that the contents information distributed for demonstration on the display device 31 will be printed with improved appearance and with high quality when the contents information is printed by the printer 32. Specifically, the color or the density of the text or picture data is adjusted relative to the background color or density to facilitate the distinction of the text or picture data from the background to impove the appearance. Alternatively, the text or picture data is processed with dithering or smoothing by way of conversion for achieving high quality printing results on printing even if the contents information is distributed for display and hence the resolution is relatively low.

According to the present invention, in which the STB 30 is provided with the contents information conversion unit 68, the contents information distributed for demonstration on the display device 31 can be changed to the contents suited for printing by the printer 32. This enables high-quality printing with improved appearance. Moreover, the printing can be made flexible depending on the printing characteristics of the printer head 87 in the printer 32, types of the printing sheets and color reproducing characteristics of the ink used.

Figure 21:
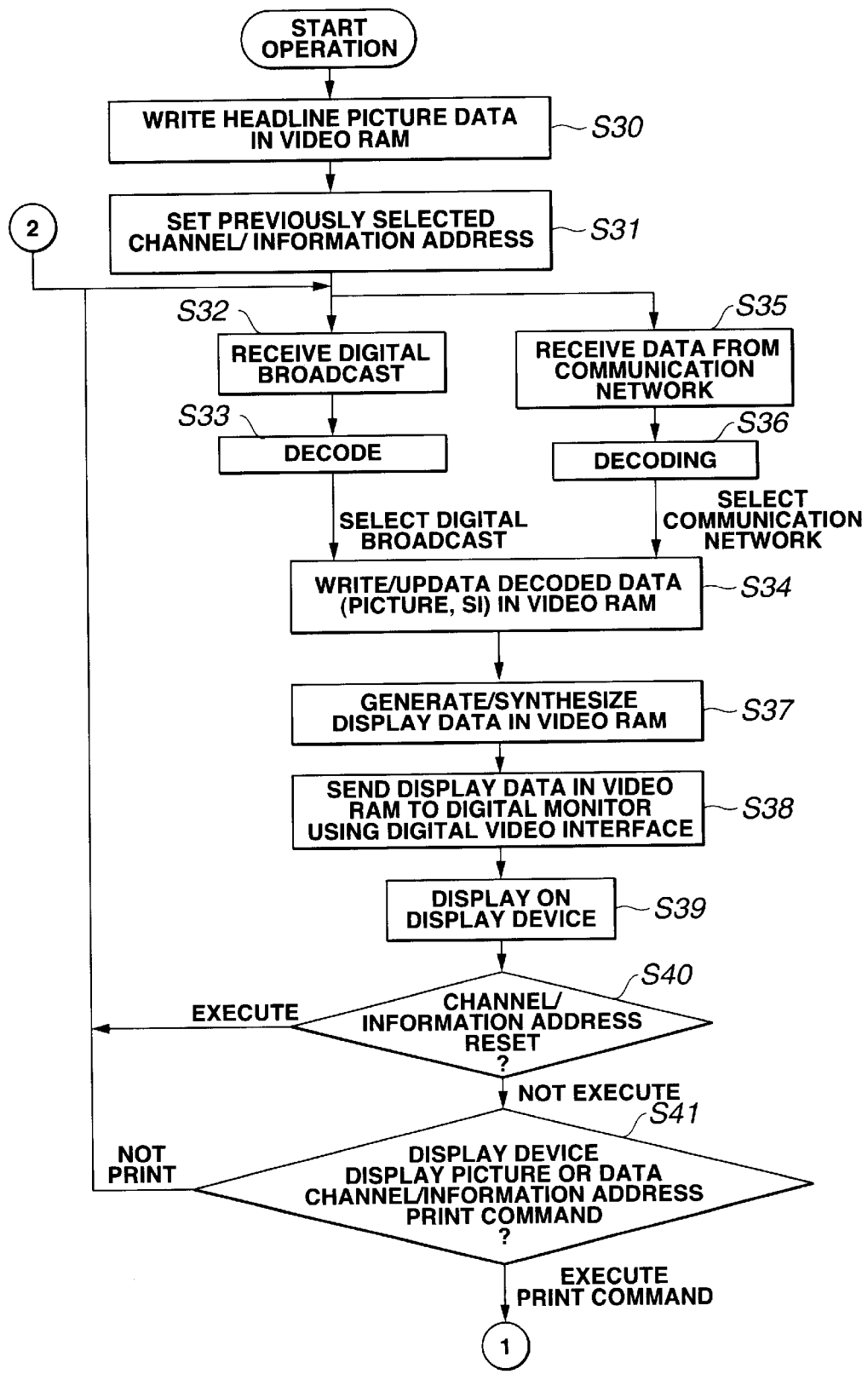
FIGS. 21 and 22 constitute a flowchart for illustrating a typical operation of the STB, display device and the printer device embodying the present invention.
Figure 22:
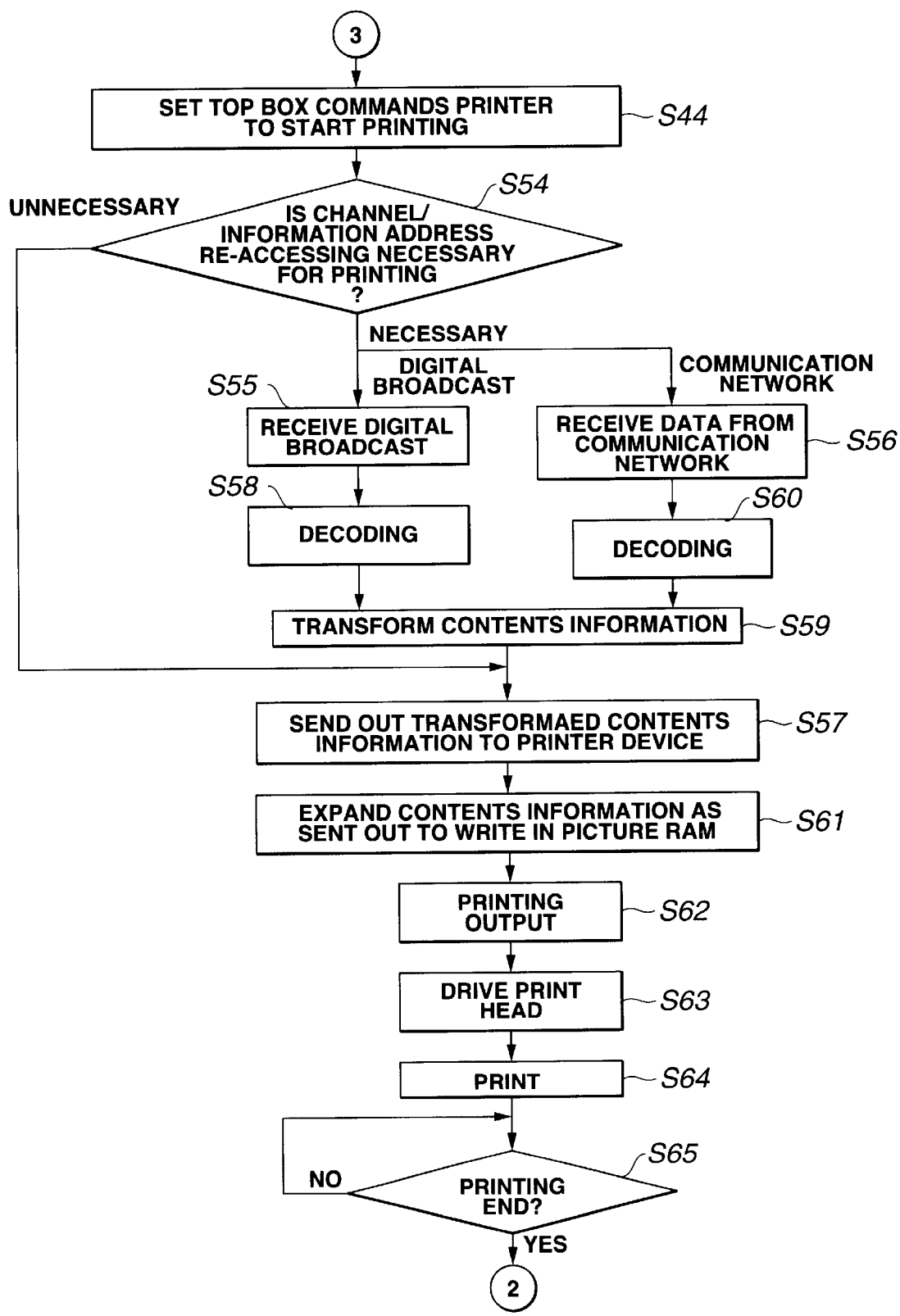

Referring to FIGS. 21 and 22, typical operations of the aforementioned STB 30, display device 31 and the printer 32 are explained.

After the start of the operation, the STB 30 received various broadcasts to synthesize them together in the synthesis unit 59 to write a synthesized picture in the video RAM 60. The picture to be synthesized is an initial picture shown for example in FIG. 10. This initial picture is transmitted as picture signals to the display device 31 for demonstration on the display device drive 73 of the display device 31.

If no operational command is sent from a user for a pre-set time, the program or the information address, selected previously, is acquired from e.g. a flash memory of the CPU system 65, as indicated at step S31, to set the program broadcast or the information address.

If, at step S31, the demonstration of the program broadcast is set, the pre-set program broadcast is received by e.g., the downconverter 50 or the tuner 51.

The picture signals or the SI signals then are decoded by the descrambler 54 and the picture decoder 56 as indicated at step S33.

Then, as indicated at step S34, the decoded picture signals or SI signals are synthesized by the synthesis unit 59 to update the contents information to be written in the video RAM 60. At this time, the contents information prior to decoding, as separated by the packet disassembly unit 55, and the contents information, as decoded by the picture decoder 56 and the data decoder 58, is transiently held in the contents information memory 67.

If the information address is set at step S31, the communication network is accessed by, for example, the modem 64, to acquire the pre-set information, as indicated at step S35. Alternatively, the pre-set digital broadcast is received at step S35 to acquire the pre-set information.

Then, as indicated at step S36, the pre-set information acquired is decoded by e.g., the data decoder 58 and the CPU system 65. The program then moves to step S34.

The contents information updated at step S34 is generated as a picture demonstrated in the video RAM 60.

The display picture generated in the video RAM 60 is routed via digital video signal outputting unit 61 to the display device 31 as picture signals, as indicated at step S38.

The picture signals then are received in the display device 31 at step S39 to demonstrate the display picture on the display device drive 73.

The I/O controller 63 of the STB 30 then verifies whether or not a command for the operation for selecting the broadcast program or the information address, for example, has been input by the user. If such command has been input, the program reverts to step S32 or S35 to receive the new program broadcast or the information address, whereas, if such command has not been input, the program moves to step S41.

At step S41, the I/O controller 63 verifies whether or not the command for operation for printing start has been input. If the command has been input, the program moves to step S44 in FIG. 22. If such command has not been input, the program reverts to step S32 or S35 to continue to receive the program broadcast or the information address to update the display of the contents information.

At step S44, the STB 30 sends a command for printing start to the printer 32 through the printer control signal interface 66, as shown in FIG. 22.

Then, at step S54, the CPU system 65 of the STB 30 or the printer CPU system 89 of the printer 32 verifies whether or not the program broadcast or the information address is to be accessed in order to acquire the contents information for printing. If the program broadcast or the information address is to be accessed, the program moves to step S55 or S56. If otherwise, the program moves to step S57.

At step S55, the STB 30 newly receives the pre-set program broadcast. The program then moves to step S58.

Then, at step S58, the STB 30 decodes the program broadcast as received. At this time, the contents information prior to decoding, separated by the packet disassembly unit 55, and the decoded contents information, as decoded by the picture decoder 56 and the data decoder 58, is transiently held by the contents information memory 67.

Then, at step Synthesis unit 59, the STB 30 converts the contents information stored in the contents information memory 67 by the contents information conversion unit 68. The program then moves to step S57.

Then, at step S56, the STB 30 newly receives the pre-set information address. The program then moves to step S60.

Then, at step S60, the STB 30 decodes the received information address. The program then moves to step S59. At this time, the pre-decoding contents information, separated from the packet disassembly unit 55, and the decoded contents information, decoded by the data decoder 58, are transiently stored in the contents information memory 67.

At step S57, the STB 30 sends the contents information converted by the contents information conversion unit 68 to the printer 32 through the contents information outputting unit 69.

At step S61, the printer 32 expands the contents information input from the STB 30 via the contents information inputting unit 80 by the contents information expanding unit 82 and the printer CPU system 89 for writing the picture for printing in the print picture RAM 84.

Then, at step S62, the print output processor 85 converts the contents information held by the print picture RAM 84 into printing data suited for printing.

Then, at step S63, the printer head 87 is driven by the printer head driving unit 86 based on the printing data.

Then, at step S64, the printer head 87 prints the data on the printing sheet.

Then, at step S65, the printer CPU system 89 verifies whether or not the printing operation has been finished. If the printing operation has been finished, the program moves to step S32 or S35 shown in FIG. 21 to re-initiate reception of the program broadcast or the information address by the STB 30 and updating of the video RAM 60. If the printing operation has not been finished, the printing operation is continued, whilst the decision at this step S65 is repeated.

In the digital broadcast reception system, according to the present invention, operating as discussed above, the contents information comprehended in the digital broadcast are demonstrated on the display device 31. If the contents information is to be printed by the printer 32, the contents information generated for display purposes is converted into contents suited for printing, before printing the contents information.

Meanwhile, in the above explanation, the contents information conversion unit 68 for converting the contents information is provided in the STB 30. The present invention is, however, not limited to this configuration.

For example, the contents information conversion unit 68 may be provided upstream of the contents information expanding unit 82 in the printer 32, instead of on the STB 30, with the contents information transmitted from the STB 30 to the printer 32 being then converted by the contents information conversion unit 68 provided on the printer 32. Since this eliminates the necessity of providing the contents information conversion unit 68 on the STB 30, the low cost for the entire system can be achieved in case the printer 32 is not connected to the digital broadcast reception system.

Each one contents information outputting unit 69 may also be provided upstream of the STB 30 and the contents information expanding unit 82. In such case, only a portion of the contents information to be printed may be converted by the contents information conversion unit 68 in the STB 30, the converted contents information being then transmitted to the printer 32. The contents information so transmitted may further be converted by the contents information conversion unit 68 of the printer 32. By providing the contents information conversion unit 68 in a distributed fashion in the STB 30 and in the printer 32, it is possible for the STB 30 to perform the conversion of the moving pictures and still pictures in need of a large computational capability, with the printer 32 then taking charge of the conversion processing in need of only limited compuuttational capability, such as changes of the tag contents of the markup language. The picture decoder 56 and the data decoder 58 may also be used as the contents information conversion unit 68 in the STB 30. By so doing, the harware indispensable for an actual product may be efficiently utilized in the STB 30 and in the printer 32 to furnish the respective devices at well-balanced costs.

In the foregoing, description has been made of a case in which the STB 30, as a receiver, the display device 31 and the printer 32 are formed as separate units. The present invention is, however, not limited to this configuration of the digital broadcast reception system, such that the present invention may be applied to a case in which part or all of the respective devices are formed as unitary structure, as shown for example in FIGS. 4, 5 and 7.

For example, if an STB 40 has a receiver 42 and a printer 43, and is connected to a display device 41 formed as a separate device with respect to the STB 40, the receiver 42 may be configured similarly to the STB 30, whilst the printer 40 may be configured similarly to the printer 32. If the present invention is applied to the digital broadcast reception system comprising the respective devices unified together, part of the configuration of the structures of the STB 30, display device 31 and the printer 32, in partiucular, the interfacing units responsible for signal input and output may be omitted to reduce the cost. However, in such case, the degree of freedom of the system configuration is lowered. If the present invention is applied to the STB 40, the control software structure of the CPU system is desirably split into the receiver 41 and the printer 42, with the control task of the receiver 41 and that of the printer 42 then being controlled separately from each other. Specifically, the control task in the receiver 41 may be controlled by the CPU system 65, with the control task on the printer 42 being then controlled by the printer CPU system 89.

What is claimed is:

1. A digital broadcast reception system having a receiver for receiving digital broadcast, a display device for displaying the digital broadcast received by said receiver, and a printer for printing contents information of the digital broadcast received by said receiver, said receiver, display device and the printer being connected to one another, wherein said receiver includes reception means for receiving the digital broadcast;

contents information generating means for performing pre-set signal processing on signals of the digital broadcast received by said reception means to generate contents information for demonstration on said display device; and outputting means for outputting the contents information generated by said contents information generating means to said display device and to said printer; and wherein said printer includes inputting means for receiving the contents information output from said reception device;

contents information converting means for converting characteristics of at least a portion of said contents information received from said inputting means to modify the appearance of said contents information when printed, wherein the characteristics of said contents information is converted by changing a background color of said contents information; and printing means for printing the contents information converted by said contents information converting means.

2. The digital broadcast reception system according to claim 1 wherein said receiver includes a first contents information converting means for converting a portion of the contents information generated by said contents information generating means to modify the appearance of a portion of said contents information when printed;

said outputting means of said receiver outputting the contents information generated by said contents information generating means to said display device and outputting the contents information partially converted by said first contents information converting means to said printer; and said contents information converting means of said printer being a second contents information converting means that converts the partially converted contents information outputted to said printer to fully converted contents information in which the appearance of said contents information is fully modified.

3. A digital broadcast reception system having a receiver for receiving digital broadcast, a display device for displaying the digital broadcast received by said receiver, and a printer for printing contents information of the digital broadcast received by said receiver, said receiver, display device and the printer being connected to one another, wherein (1) said receiver includes (a) reception means for receiving the digital broadcast;

(b) contents information generating means for performing pre-set signal processing on signals of the digital broadcast received by said reception means to generate contents information for demonstration on said display device;

(c) first contents information converting means for converting a portion of the contents information generated by said contents information generating means to modify the appearance of a portion of said contents information when printed;

(d) outputting means for outputting the contents information generated by said contents information generating means to said display device and for outputting the contents information partially converted by said first contents information converting means to said printer; wherein (2) said printer includes (a) inputting means for receiving the partially converted contents information output from said outputting means of said receiver;

(b) second contents information converting means for converting the partially converted contents information to fully converted contents information in which the appearance of said contents information is fully modified; and (c) printing means for printing the contents information converted by said second contents information converting means; and wherein said first contents information conversion means performs conversion processing of pictures in need of relatively high computational capability, and said second contents information conversion means performs conversion processing requiring relatively low computational capability.

4. The digital broadcast reception system according to claim 3 wherein said conversion processing performed by said second contents information conversion means comprises processing to change tag contents of a markup language.

5. A digital broadcast reception system having a receiver for receiving digital broadcast, a display device for displaying the digital broadcast received by said receiver, and a printer for printing contents information of the digital broadcast received by said receiver, said receiver, display device and the printer being connected to one another, wherein said receiver includes reception means for receiving the digital broadcast;

contents information generating means for performing pre-set signal processing on signals of the digital broadcast received by said reception means to generate contents information for demonstration on said display device; and outputting means for outputting the contents information generated by said contents information generating means to said display device and to said printer; and wherein said printer includes inputting means for receiving the contents information output from said reception device;

contents information converting means for converting characteristics of at least a portion of said contents information received from said inputting means to modify the appearance of said contents information when printed, wherein said contents information converting means converts characteristics of said contents information by changing color or resolution of text or picture data of said contents information; and printing means for printing the contents information converted by said contents information converting means.

6. A digital broadcast reception system having a receiver for receiving digital broadcast, a display device for displaying the digital broadcast received by said receiver, and a printer for printing contents information of the digital broadcast received by said receiver, said receiver, display device and the printer being connected to one another, wherein said receiver includes reception means for receiving the digital broadcast;

contents information generating means for performing pre-set signal processing on signals of the digital broadcast received by said reception means to generate contents information for demonstration on said display device; and outputting means for outputting the contents information generated by said contents information generating means to said display device and to said printer; and wherein said printer includes inputting means for receiving the contents information output from said reception device;

contents information converting means for converting characteristics of at least a portion of said contents information received from said inputting means to modify the appearance of said contents information when printed, wherein said contents information converting means converts characteristics of said contents information by adjusting color or density of text or picture data of said contents information relative to a background color of said contents information; and printing means for printing the contents information converted by said contents information converting means.

7. A digital broadcast reception system having a receiver for receiving digital broadcast, a display device for displaying the digital broadcast received by said receiver, and a printer for printing contents information of the digital broadcast received by said receiver, said receiver, display device and the printer being connected to one another, wherein said receiver includes reception means for receiving the digital broadcast;

contents information generating means for performing pre-set signal processing on signals of the digital broadcast received by said reception means to generate contents information for demonstration on said display device; and outputting means for outputting the contents information generated by said contents information generating means to said display device and to said printer; and wherein said printer includes inputting means for receiving the contents information output from said reception device;

contents information converting means for converting characteristics of at least a portion of said contents information received from said inputting means to modify the appearance of said contents information when printed, wherein said contents information converting means converts characteristics of said contents information by performing dithering or smoothing processing of said contents information to improve printing quality thereof; and printing means for printing the contents information converted by said contents information converting means.

8. The digital broadcast reception system according to claim 1 wherein contents information of said digital broadcast is described in HTML form, and wherein a HTML tag of the digital broadcast specifying a background color is maintained unchanged for pictures to be displayed on said display device so as to maintain unchanged the background color of displayed pictures, and is changed by said conversion means for pictures to be printed by said printer, so as to change the background color of the printed pictures.

9. A digital broadcast reception system having a receiver for receiving digital broadcast, a display device for displaying the digital broadcast received by said receiver, and a printer for printing contents information of the digital broadcast received by said receiver, said receiver, display device and the printer being connected to one another, wherein said receiver includes reception means for receiving the digital broadcast;

contents information generating means for performing pre-set signal processing on signals of the digital broadcast received by said reception means to generate contents information for demonstration on said display device;

contents information converting means for converting characteristics of at least a portion of the contents information generated by said contents information generating means to modify the appearance of said contents information when printed, wherein said contents information converting means converts characteristics of said contents information by changing a background color of said contents information; and outputting means for outputting the contents information generated by said contents information generating means to said display device and outputting the contents information partially converted by said contents information conversion means to said printer; and wherein said printer includes inputting means for receiving the contents information output by said receiver; and printing means for printing the contents information received from said inputting means.

10. A digital broadcast reception system having a receiver for receiving digital broadcast, a display device for displaying the digital broadcast received by said receiver, and a printer for printing contents information of the digital broadcast received by said receiver, said receiver, display device and the printer being connected to one another, wherein said receiver includes reception means for receiving the digital broadcast;

contents information generating means for performing pre-set signal processing on signals of the digital broadcast received by said reception means to generate contents information for demonstration on said display device;

contents information converting means for converting characteristics of at least a portion of the contents information generated by said contents information generating means to modify the appearance of said contents information when printed, wherein said contents information converting means converts characteristics of said contents information by changing color or resolution of text or picture data of said contents information; and outputting means for outputting the contents information generated by said contents information generating means to said display device and outputting the contents information partially converted by said contents information conversion means to said printer; and wherein said printer includes inputting means for receiving the contents information output by said receiver; and printing means for printing the contents information received from said inputting means.

11. A digital broadcast reception system having a receiver for receiving digital broadcast, a display device for displaying the digital broadcast received by said receiver, and a printer for printing contents information of the digital broadcast received by said receiver, said receiver, display device and the printer being connected to one another, wherein said receiver includes reception means for receiving the digital broadcast;

contents information generating means for performing pre-set signal processing on signals of the digital broadcast received by said reception means to generate contents information for demonstration on said display device;

contents information converting means for converting characteristics of at least a portion of the contents information generated by said contents information generating means to modify the appearance of said contents information when printed, wherein said contents information converting means converts characteristics of said contents information by adjusting color or density of text or picture data of said contents information relative to a background color of said contents information; and outputting means for outputting the contents information generated by said contents information generating means to said display device and outputting the contents information partially converted by said contents information conversion means to said printer; and wherein said printer includes inputting means for receiving the contents information output by said receiver; and printing means for printing the contents information received from said inputting means.

12. A digital broadcast reception system having a receiver for receiving digital broadcast, a display device for displaying the digital broadcast received by said receiver, and a printer for printing contents information of the digital broadcast received by said receiver, said receiver, display device and the printer being connected to one another, wherein said receiver includes reception means for receiving the digital broadcast;

contents information generating means for performing pre-set signal processing on signals of the digital broadcast received by said reception means to generate contents information for demonstration on said display device;

contents information converting means for converting characteristics of at least a portion of the contents information generated by said contents information generating means to modify the appearance of said contents information when printed, wherein said contents information converting means converts characteristics of said contents information by performing dithering or smoothing processing of said contents information to improve printing quality thereof; and outputting means for outputting the contents information generated by said contents information generating means to said display device and outputting the contents information partially converted by said contents information conversion means to said printer; and wherein said printer includes inputting means for receiving the contents information output by said receiver; and printing means for printing the contents information received from said inputting means.

13. The digital broadcast reception system according to claim 9 wherein contents information of said digital broadcast is described in HTML form, and wherein a HTML tag of the digital broadcast specifying a background color is maintained unchanged for pictures to be displayed on said display device so as to maintain unchanged the background color of displayed pictures, and is changed by said conversion means for pictures to be printed by said printer, so as to change the background color of the printed pictures.

* * * * *